US008135962B2

(12) United States Patent
Strongin et al.

(10) Patent No.: US 8,135,962 B2
(45) Date of Patent: Mar. 13, 2012

(54) SYSTEM AND METHOD PROVIDING REGION-GRANULAR, HARDWARE-CONTROLLED MEMORY ENCRYPTION

(75) Inventors: Geoffrey S. Strongin, Austin, TX (US); Brian C. Barnes, Round Rock, TX (US); Rodney Schmidt, Dripping Springs, TX (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 2855 days.

(21) Appl. No.: 10/108,253

(22) Filed: Mar. 27, 2002

(65) Prior Publication Data

US 2003/0188178 A1 Oct. 2, 2003

(51) Int. Cl.
*G06F 11/30* (2006.01)
(52) U.S. Cl. ........ 713/190; 713/189; 711/163; 711/164; 726/1; 726/2; 726/22; 726/26
(58) Field of Classification Search .................. 711/163, 711/164; 713/160, 189, 190; 709/232; 710/4; 726/1, 2, 22, 26
See application file for complete search history.

(56) References Cited

U.S. PATENT DOCUMENTS

| 4,975,952 | A | * | 12/1990 | Mabey et al. ................. 713/160 |
|---|---|---|---|---|
| 5,757,919 | A | | 5/1998 | Herbert et al. .................. 380/25 |
| 5,784,459 | A | | 7/1998 | Devarakonda et al. ........... 380/4 |
| 5,915,025 | A | | 6/1999 | Taguchi et al. ................. 380/44 |
| 6,003,117 | A | * | 12/1999 | Buer et al. ..................... 711/163 |
| 6,199,181 | B1 | * | 3/2001 | Rechef et al. .............. 714/38.13 |
| 6,408,384 | B1 | * | 6/2002 | Adams ......................... 712/227 |
| 6,523,118 | B1 | * | 2/2003 | Buer ............................ 713/189 |
| 6,704,768 | B1 | * | 3/2004 | Zombek et al. ............... 709/201 |
| 6,854,039 | B1 | * | 2/2005 | Strongin et al. .............. 711/163 |
| 2002/0056047 | A1 | * | 5/2002 | Lehman ....................... 713/200 |
| 2002/0118206 | A1 | * | 8/2002 | Knittel ......................... 345/557 |
| 2002/0129245 | A1 | * | 9/2002 | Cassagnol et al. ............ 713/168 |
| 2003/0046256 | A1 | * | 3/2003 | Hugosson et al. ................ 707/1 |
| 2003/0177354 | A1 | * | 9/2003 | Carter .......................... 713/164 |

* cited by examiner

*Primary Examiner* — Christian Laforgia
*Assistant Examiner* — Roderick Tolentino
(74) *Attorney, Agent, or Firm* — Williams, Morgan & Amerson, P.C.

(57) ABSTRACT

A memory, system, and method for providing security for data stored within a memory and arranged within a plurality of memory regions. The method includes receiving an address within a selected memory region and using the address to access an encryption indicator. The encryption indicator indicates whether data stored in the selected memory page are encrypted. The method also includes receiving a block of data from the selected memory region and the encryption indicator and decrypting the block of data dependent upon the encryption indicator.

41 Claims, 15 Drawing Sheets

PAGE DIRECTORY ENTRY FORMAT 200:

PAGE TABLE ENTRY FORMAT 300:

SAT DIRECTORY ENTRY FORMAT 1100:

SAT ENTRY FORMAT 1200:

PHYSICAL ADDRESS 1700:

CACHE ENTRY 1800:

CACHE DIRECTORY ENTRY 1900:

SYSTEM AND METHOD PROVIDING REGION-GRANULAR, HARDWARE-CONTROLLED MEMORY ENCRYPTION

CROSS-REFERENCE TO RELATED APPLICATIONS

This patent application is related to co-pending patent application Ser. No. 10/011,151, entitled "System and Method for Handling Device Accesses to a Memory Providing Increased Memory Access Security and co-pending patent application Ser. No. 10/005,271, entitled "Memory Management System and Method Providing Increased Memory Access Security", both filed on Dec. 5, 2001, and co-pending patent application Ser. No. 10/107,776 entitled "System and Method for Controlling Device-To-Device Accesses Within a Computer System", filed on the same day as the present patent application.

BACKGROUND OF THE INVENTION

1. Field of the Invention

This invention relates generally to computer systems, and, more particularly, to systems and methods for protecting confidential data from discovery via external monitoring of signals during transfers of the confidential data within computer systems.

2. Description of the Related Art

A typical computer system includes a memory hierarchy in order to obtain a relatively high level of performance at relatively low cost. Instructions of several different software programs are typically stored on a relatively large but slow non-volatile storage unit (e.g., a disk drive unit). When a user selects one of the programs for execution, the instructions of the selected program are copied into a main memory unit, and a central processing unit (CPU) obtains the instructions of the selected program from the main memory unit. The well-known virtual memory management technique allows the CPU to access data structures larger in size than that of the main memory unit by storing only a portion of the data structures within the main memory unit at any given time. Remainders of the data structures are stored within the relatively large but slow non-volatile storage unit, and are copied into the main memory unit only when needed.

Virtual memory is typically implemented by dividing an address space of the CPU into multiple blocks called page frames or "pages." Only data corresponding to a portion of the pages is stored within the main memory unit at any given time. When the CPU generates an address within a given page, and a copy of that page is not located within the main memory unit, the required page of data is copied from the relatively large but slow non-volatile storage unit into the main memory unit. In the process, another page of data may be copied from the main memory unit to the non-volatile storage unit to make room for the required page.

The popular 80x86 (x86) processor architecture includes specialized hardware elements to support a protected virtual address mode (i.e., a protected mode). FIGS. 1-3 will now be used to describe how an x86 processor implements both virtual memory and memory protection features. FIG. 1 is a diagram of a well-known linear-to-physical address translation mechanism 100 of the x86 processor architecture. Address translation mechanism 100 is embodied within an x86 processor, and involves a linear address 102 produced within the x86 processor, a page table directory (i.e., a page directory) 104, multiple page tables including a page table 106, multiple page frames including a page frame 108, and a control register 3 (CR3) 110. Page directory 104 and the multiple page tables are paged memory data structures created and maintained by operating system software (i.e., an operating system). Page directory 104 is always located within a memory (e.g., a main memory unit). For simplicity, page table 106 and page frame 108 will also be assumed to reside in the memory.

As indicated in FIG. 1, linear address 102 is divided into three portions in order to accomplish the linear-to-physical address translation. The highest ordered bits of CR3 110 are used to store a page directory base register. The page directory base register is a base address of a memory page containing page directory 104. Page directory 104 includes multiple page directory entries, including a page directory entry 112. An upper "directory index" portion of linear address 102, including the highest ordered or most significant bits of linear address 102, is used as an index into page directory 104. Page directory entry 112 is selected from within page directory 104 using the page directory base register of CR3 110 and the upper "directory index" portion of linear address 102.

FIG. 2 is a diagram of a page directory entry format 200 of the x86 processor architecture. As indicated in FIG. 2, the highest ordered (i.e., most significant) bits of a given page directory entry contain a page table base address, where the page table base address is a base address of a memory page containing a corresponding page table. The page table base address of page directory entry 112 is used to select the corresponding page table 106.

Referring back to FIG. 1, page table 106 includes multiple page table entries, including a page table entry 114. A middle "table index" portion of linear address 102 is used as an index into page table 106, thereby selecting page table entry 114. FIG. 3 is a diagram of a page table entry format 300 of the x86 processor architecture. As indicated in FIG. 3, the highest ordered (i.e., most significant) bits of a given page table entry contain a page frame base address, where the page frame base address is a base address of a corresponding page frame.

Referring back to FIG. 1, the page frame base address of page table entry 114 is used to select corresponding page frame 108. Page frame 108 includes multiple memory locations. A lower or "offset" portion of linear address 102 is used as an index into page frame 108. When combined, the page frame base address of page table entry 114 and the offset portion of linear address 102 produce the physical address corresponding to linear address 102, and indicate a memory location 116 within page frame 108. Memory location 116 has the physical address resulting from the linear-to-physical address translation.

Regarding the memory protection features, page directory entry format 200 of FIG. 2 and page table entry format 300 of FIG. 3 include a user/supervisor (U/S) bit and a read/write (R/W) bit. The contents of the U/S and R/W bits are used by the operating system to protect corresponding page frames (i.e., memory pages) from unauthorized access. U/S=0 is used to denote operating system memory pages, and corresponds to a "supervisor" level of the operating system. The supervisor level of the operating system corresponds to current privilege level 0 (CPL0) of software programs and routines executed by the x86 processor. (The supervisor level may also correspond to CPL1 and/or CPL2 of the x86 processor.) U/S=1 is used to indicate user memory pages, and corresponds to a "user" level of the operating system. The user level of the operating system corresponds to CPL3 of the x86 processor. (The user level may also correspond to CPL1 and/or CPL2 of the x86 processor.)

The R/W bit is used to indicate types of accesses allowed to the corresponding memory page. R/W=0 indicates the only read accesses are allowed to the corresponding memory page (i.e., the corresponding memory page is "read-only"). R/W=1 indicates that both read and write accesses are allowed to the corresponding memory page (i.e., the corresponding memory page is "read-write").

During the linear-to-physical address translation operation of FIG. 1, the contents of the U/S bits of page directory entry 112 and page table entry 114, corresponding to page frame 108, are logically ANDed determine if the access to page frame 108 is authorized. Similarly, the contents of the R/W bits of page directory entry 112 and page table entry 114 are logically ANDed to determine if the access to page frame 108 is authorized. If the logical combinations of the U/S and R/W bits indicate the access to page frame 108 is authorized, memory location 116 is accessed using the physical address. On the other hand, if the logical combinations of the U/S and R/W bits indicate the access to page frame 108 is not authorized, memory location 116 is not accessed, and a protection fault indication is signaled.

Unfortunately, the above described memory protection mechanisms of the x86 processor architecture are not sufficient to protect data stored in the memory. For example, any software program or routine executing at the supervisor level (e.g., having a CPL of 0) can access any portion of the memory, and can modify (i.e., write to) any portion of the memory that is not marked "read-only" (R/W=0). In addition, by virtue of executing at the supervisor level, the software program or routine can change the attributes (i.e., the U/S and R/W bits) of any portion of the memory. The software program or routine can thus change any portion of the memory marked "read-only" to "read-write" (R/W=1), and then proceed to modify that portion of the memory.

The protection mechanisms of the x86 processor architecture are also inadequate to prevent errant or malicious accesses to the memory by hardware devices operably coupled to the memory. It is true that portions of the memory marked "read-only" cannot be modified by write accesses initiated by hardware devices (without the attributes of those portions of the memory first being changed as described above). It is also true that software programs or routines (e.g., device drivers) handling data transfers between hardware devices and the memory typically execute at the user level (e.g., CPL3), and are not permitted access to portions of the memory marked as supervisor level (U/S=0). However, the protection mechanisms of the x86 processor architecture cover only device accesses to the memory performed as a result of instruction execution (i.e., programmed input/output). A device driver can program a hardware device having bus mastering or DMA capability to transfer data from the device into any portion of the memory accessible by the hardware device. For example, it is relatively easy to program a floppy disk controller to transfer data from a floppy disk directly into a portion of the memory used to store the operating system.

Further, the CPU communicates with other computer system components (e.g., the memory) via signals conveyed upon signal lines. Such signals are subject to monitoring (e.g., by external equipment). Analysis of such signals may reveal not only confidential data being transferred, but also methods embodied within the computer system (e.g., software programs) used to process the confidential data.

It would thus be beneficial to have a system and method for providing increased access security for the memory. The desired system and method would also include the capability to encrypt all data (including instructions) transferred in and out of the CPU in order to mask both confidential data and the methods used to process the confidential data.

SUMMARY OF THE INVENTION

In one aspect of the present invention, a memory is provided. The memory includes at least one storage location and an encryption/decryption unit for encrypting and decrypting data. The storage location is coupled to receive a block of data and a corresponding encryption indicator for the block of data. The block of data corresponds to a selected memory region. The encryption indicator indicates whether the data corresponding to the selected memory region is encrypted. The encryption/decryption unit is configured to decrypt the block of data dependent upon the encryption indicator before the block of data is stored in the storage location.

In another aspect of the present invention, a system is provided. The system includes a memory management unit (MMU) operably coupled to a memory and configured to manage the memory, a security check unit coupled to receive a physical address within a selected memory region, and a cache unit coupled to receive a block of data obtained from the selected memory region and to receive an encryption indicator. The MMU is configurable to manage the memory such that the memory stores data arranged within a plurality of memory regions. The security check unit is configured to use the physical address to access at least one security attribute data structure located in the memory to obtain the encryption indicator. The encryption indicator indicates whether data stored in the selected memory region is encrypted. The security check unit is configured to provide the encryption indicator to an encryption/decryption unit. The cache unit includes the encryption/decryption unit. The encryption/decryption unit is configured to decrypt the block of data dependent upon the encryption indicator before storing the block of data.

In still another aspect of the present invention, a method for providing security for data stored within a memory and arranged within a plurality of memory regions is provided. The method includes receiving an address within a selected memory region and using the address to access an encryption indicator. The encryption indicator indicates whether data stored in the selected memory page are encrypted. The method also includes receiving a block of data from the selected memory region and the encryption indicator and decrypting the block of data dependent upon the encryption indicator.

BRIEF DESCRIPTION OF THE DRAWINGS

The invention may be understood by reference to the following description taken in conjunction with the accompanying drawings, in which like reference numerals identify similar elements, and in which.

Figure 1:
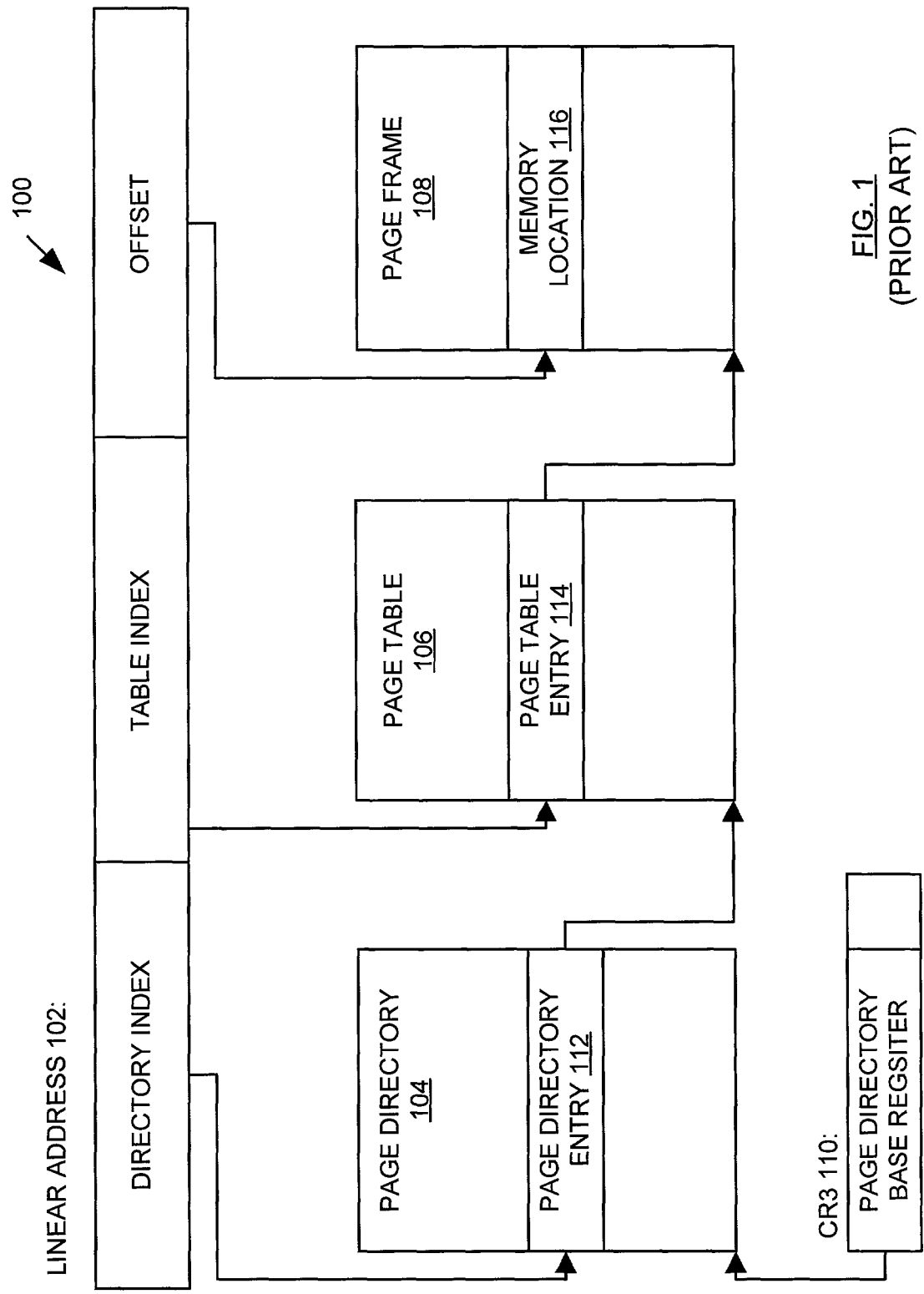
FIG. 1 is a diagram of a well-known linear-to-physical address translation mechanism of the x86 processor architecture.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
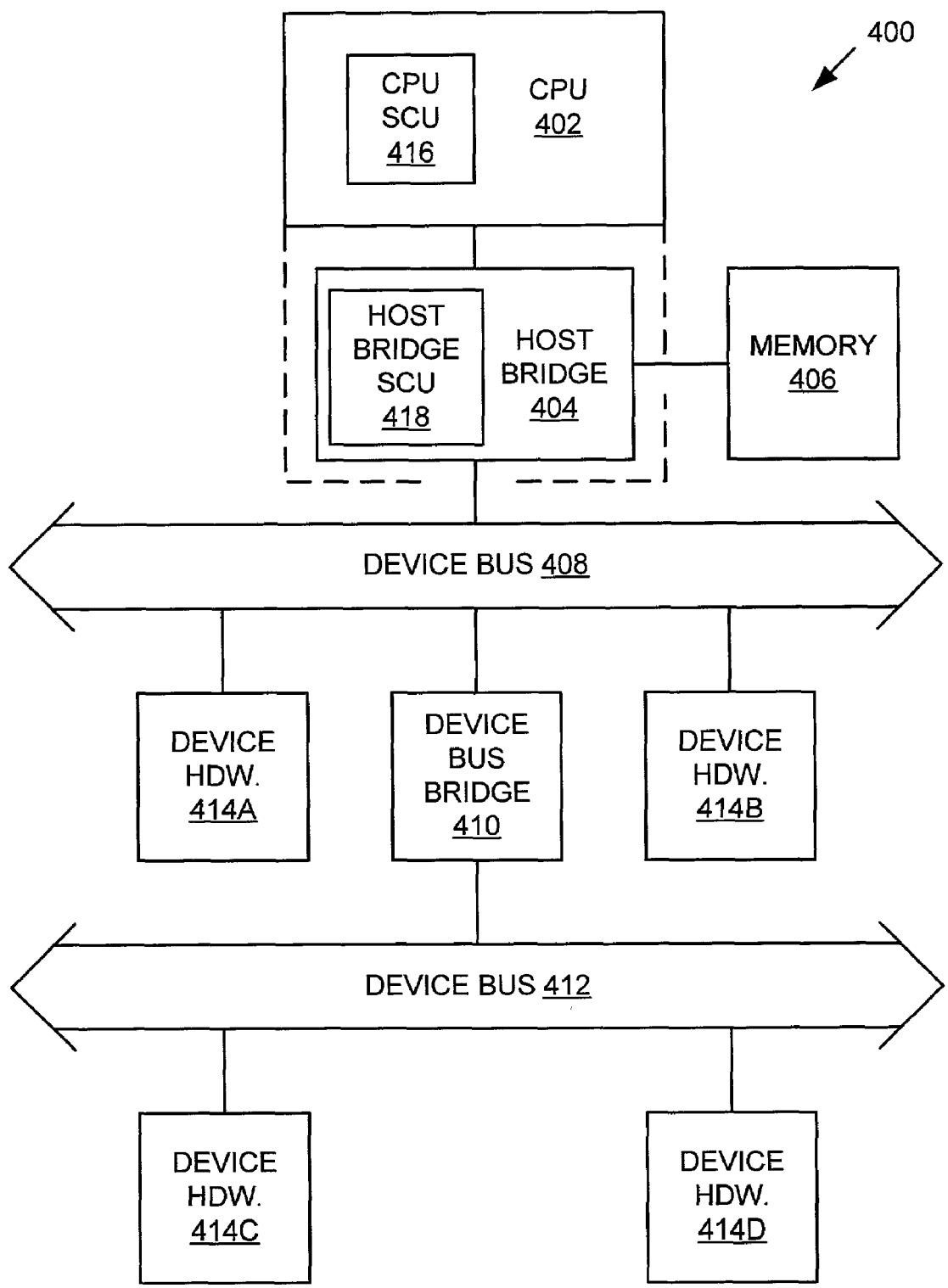
FIG. 4 is a diagram of one embodiment of a computer system including a CPU and a system or "host" bridge, wherein the CPU includes a CPU security check unit (SCU), and wherein the host bridge includes a host bridge SCU.

FIG. 4 is a diagram of one embodiment of a computer system 400 including a CPU 402, a system or "host" bridge 404, a memory 406, a first device bus 408 (e.g., a peripheral component interconnect or PCI bus), a device bus bridge 410, a second device bus 412 (e.g., an industry standard architecture or ISA bus), and four device hardware units 414A-414D. Host bridge 404 is coupled to CPU 402, memory 406, and device bus 408. Host bridge 404 translates signals between CPU 402 and device bus 408, and operably couples memory 406 to CPU 402 and to device bus 408. Device bus bridge 410 is coupled between device bus 408 and device bus 412, and translates signals between device bus 408 and device bus 412. In the embodiment of FIG. 4, device hardware units 414A and 414B are coupled to device bus 408, and device hardware units 414C and 414D are coupled to device bus 412. One or more of the device hardware units 414A-414D may be, for example, storage devices (e.g., hard disk drives, floppy drives, and CD-ROM drives), communication devices (e.g., modems and network adapters), or input/output devices (e.g., video devices, audio devices, and printers).

In the embodiment of FIG. 4, CPU 402 includes a CPU security check unit (SCU) 416, and host bridge 404 includes a host bridge SCU 418. As will be described in detail below, CPU SCU 416 protects memory 406 from unauthorized accesses generated by CPU 402 (i.e., "software-initiated accesses"), and host bridge SCU 418 protects memory 406 from unauthorized accesses initiated by device hardware units 414A-414D (i.e., "hardware-initiated accesses"). It is noted that in other embodiments, host bridge 404 may be part of CPU 402 as indicated in FIG. 4.

Figure 5:
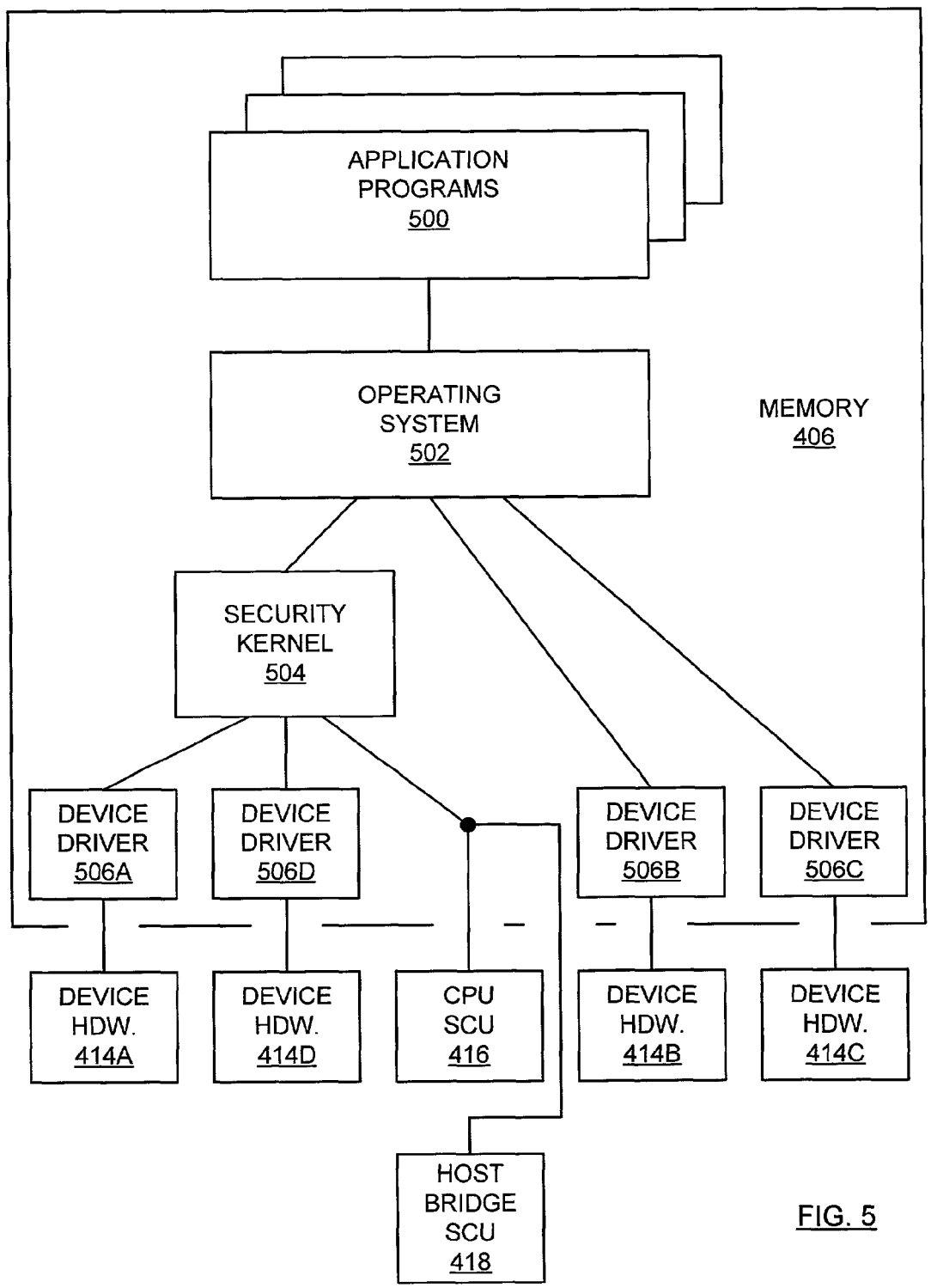
FIG. 5 is a diagram illustrating relationships between various hardware and software components of the computer system of FIG. 4.

FIG. 5 is a diagram illustrating relationships between various hardware and software components of computer system 400 of FIG. 4. In the embodiment of FIG. 5, multiple application programs 500, an operating system 502, a security kernel 504, and device drivers 506A-506D are stored in memory 406. Application programs 500, operating system 502, security kernel 504, and device drivers 506A-506D include instructions executed by CPU 402. Operating system 502 provides a user interface and software "platform" on top of which application programs 500 run. Operating system 502 may also provide, for example, basic support functions including file system management, process management, and input/output (I/O) control.

Operating system 502 may also provide basic security functions. For example, CPU 402 (FIG. 4) may be an x86 processor which executes instructions of the x86 instruction set. In this situation, CPU 402 may include specialized hardware elements to provide both virtual memory and memory protection features in the protected mode as described above. Operating system 502 may be, for example, one of the Windows® family of operating systems (Microsoft Corp., Redmond, Wash.) which operates CPU 402 in the protected mode, and uses the specialized hardware elements of CPU 402 to provide both virtual memory and memory protection in the protected mode.

As will be described in more detail below, security kernel 504 provides additional security functions above the security functions provided by operating system 502 in order to protect data stored in memory 406 from unauthorized access. In the embodiment of FIG. 5, device drivers 506A-506D are operationally associated with, and coupled to, respective corresponding device hardware units 414A-414D. Device hardware units 414A and 414D are "secure" devices, and corresponding device drivers 506A and 506D are "secure" device drivers. Security kernel 504 is coupled between operating system 502 and secure device drivers 506A and 506D, and monitors all accesses by application programs 500 and operating system 502 to secure device drivers 506A and 506D and corresponding secure devices 414A and 414D. Security kernel 504 prevents unauthorized accesses to secure device drivers 506A and 506D and corresponding secure devices 414A and 414D by application programs 500 and operating system 502.

As indicated in FIG. 5, security kernel 504 is coupled to CPU SCU 416 and host bridge SCU 418 (e.g., via one or more device drivers). As will be described in detail below, CPU SCU 416 and host bridge SCU 418 control accesses to memory 406. CPU SCU 416 monitors all software-initiated accesses to memory 406, and host bridge SCU 418 monitors all hardware-initiated accesses to memory 406. Once configured by security kernel 504, CPU SCU 416 and host bridge SCU 418 allow only authorized accesses to memory 406.

In the embodiment of FIG. 5, device drivers 506B and 506C are "non-secure" device drivers, and corresponding device hardware units 414B and 414C are "non-secure" device hardware units. Device drivers 506B and 506C and corresponding device hardware units 414B and 414C may be, for example, "legacy" device drivers and device hardware units.

It is noted that in other embodiments security kernel 504 may be part of operating system 502. In yet other embodiments, security kernel 504, device drivers 506A and 506D, and/or device drivers 506B and 506C may be part of operating system 502.

Figure 6:
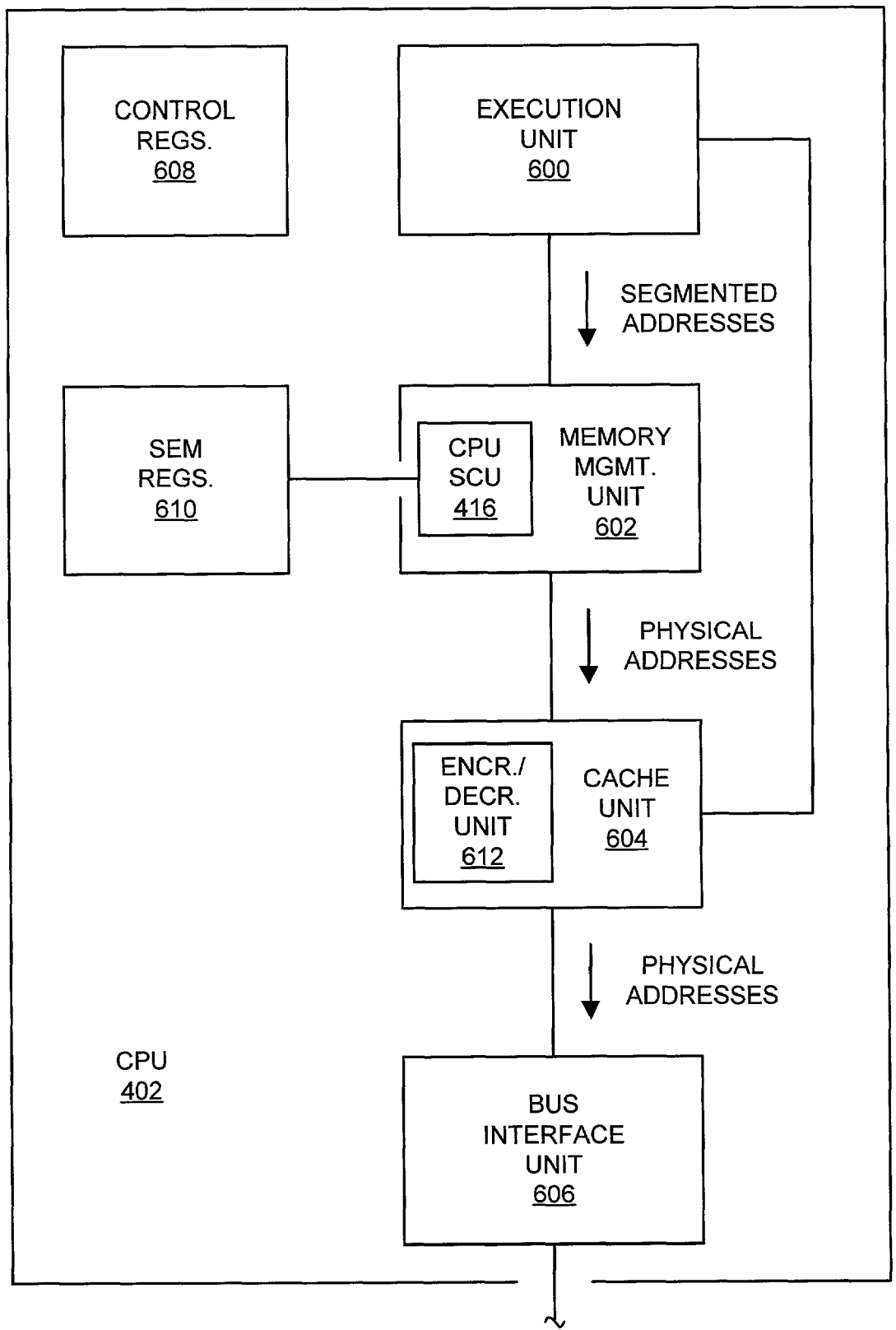
FIG. 6 is a diagram of one embodiment of the CPU of the computer system of FIG. 4, wherein the CPU includes a memory management unit (MMU) and a cache unit, wherein the cache unit includes and encryption/decryption unit which performs both a data encryption function and a data decryption function.

FIG. 6 is a diagram of one embodiment of CPU 402 of computer system 400 of FIG. 4. In the embodiment of FIG. 6, CPU 402 includes an execution unit 600, a memory management unit (MMU) 602, a cache unit 604, a bus interface unit (BIU) 606, a set of control registers 608, and a set of secure execution mode (SEM) registers 610. CPU SCU 416 is located within MMU 602. As will be described in detail below, the set of SEM registers 610 are used to implement a secure execution mode (SEM) within computer system 400 of FIG. 4, and operations of CPU SCU 416 and host bridge SCU 418 are governed by the contents of the set of SEM registers 610. SEM registers 610 are accessed (i.e., written to and/or read from) by security kernel 504 (FIG. 5). Computer system 400 of FIG. 4 may, for example, operate in the SEM when: (i) CPU 402 is an x86 processor operating in the x86 protected mode, (ii) memory paging is enabled, and (iii) the contents of SEM registers 610 specify SEM operation.

In general, the contents of the set of control registers 608 govern operation of CPU 402. Accordingly, the contents of the set of control registers 608 govern operation of execution unit 600, MMU 602, cache unit 604, and/or BIU 606. The set of control registers 608 may include, for example, the multiple control registers of the x86 processor architecture.

Execution unit 600 of CPU 402 fetches instructions (e.g., x86 instructions) and data, executes the fetched instructions, and generates signals (e.g., address, data, and control signals) during instruction execution. Execution unit 600 is coupled to cache unit 604, and may receive instructions from memory 406 (FIG. 4) via cache unit 604 and BIU 606.

Memory 406 (FIG. 4) of computer system 400 includes multiple memory locations, each having a unique physical address. When CPU 402 is operating in protected mode with paging enabled, an address space of CPU 402 is divided into multiple blocks called page frames or "pages." As described above, only data corresponding to a portion of the pages is stored within memory 406 at any given time. In the embodiment of FIG. 6, address signals generated by execution unit 600 during instruction execution represent segmented (i.e., "logical") addresses. As described below, MMU 602 translates the segmented addresses generated by execution unit 600 to corresponding physical addresses of memory 406. MMU 602 provides the physical addresses to cache unit 604. Cache unit 604 is a relatively small storage unit used to store instructions and data recently fetched by execution unit 600. BIU 606 is coupled between cache unit 604 and host bridge 404, and is used to fetch instructions and data not present in cache unit 604 from memory 406 via host bridge 404.

As indicated in FIG. 6, the cache unit 604 includes an encryption/decryption unit 612 that performs both a data encryption function and a data decryption function. When the CPU 402 is operating in protected mode with paging enabled, the memory 406 stores data arranged within multiple pages (i.e., memory pages). As described in detail below, the data (including instructions) of selected memory pages may be encrypted for security purposes. The data decryption function of encryption/decryption unit 612 is used to decrypt encrypted data (including instructions) received by cache unit 604 from memory 406 via BIU 606. The data encryption function of encryption/decryption unit 612 is used to encrypt unencrypted (i.e., "plaintext") data (including instructions), stored within cache unit 604 and available to execution unit 600, before the data is evicted from cache unit 604 (e.g., to make room for more recently referenced instructions and/or data). It is noted that the data encryption and decryption functions performed by encryption/decryption unit 612 do not affect the operation of execution unit 600 (i.e., are transparent to execution unit 600). It is also noted that in other embodiments encryption/decryption unit 612 may be located within BIU 606.

Figure 7:
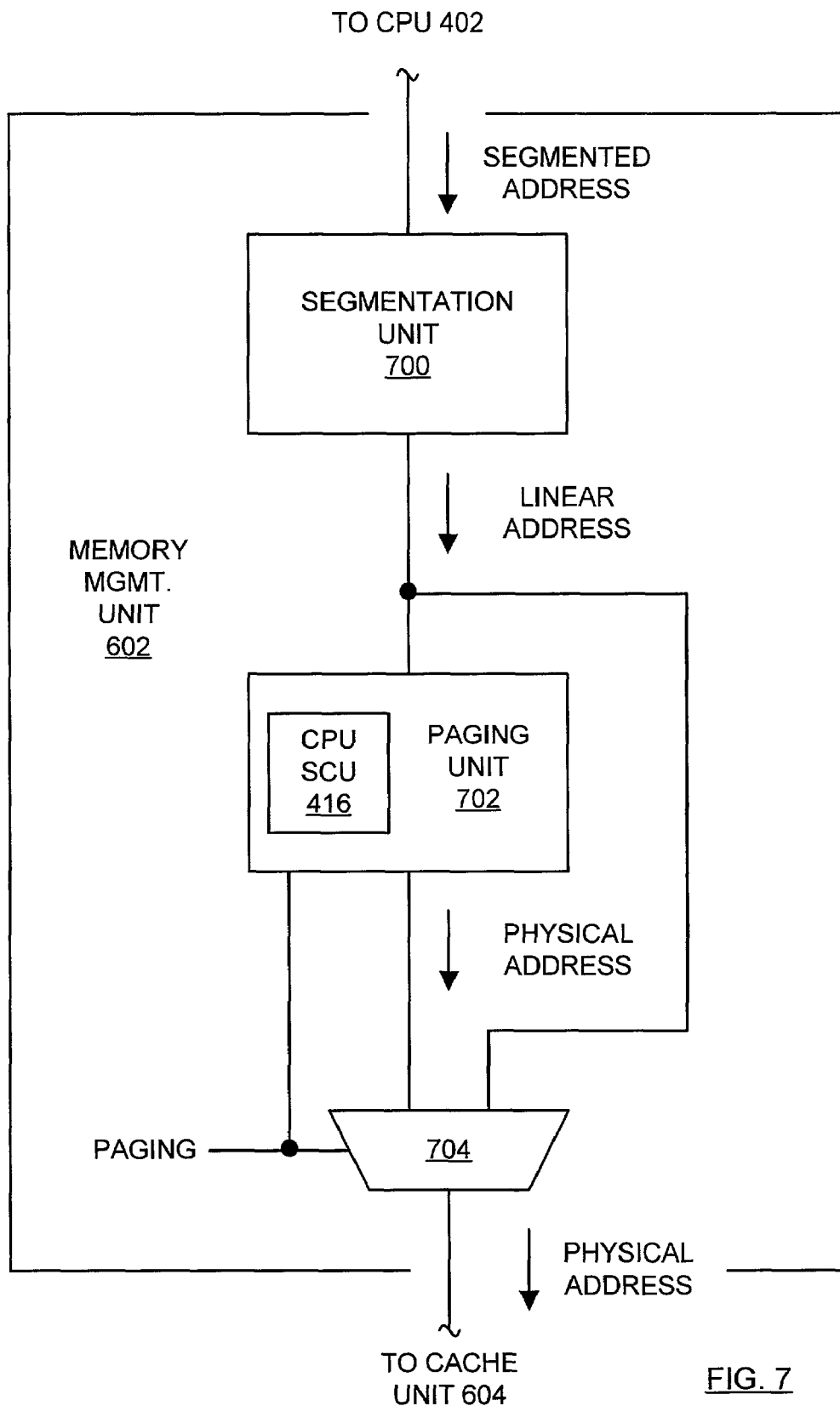
FIG. 7 is a diagram of one embodiment of the MMU of FIG. 6, wherein the MMU includes a paging unit, and wherein the paging unit includes the CPU SCU.

FIG. 7 is a diagram of one embodiment of MMU 602 of FIG. 6. In the embodiment of FIG. 7, MMU 602 includes a segmentation unit 700, a paging unit 702, and selection logic 704 for selecting between outputs of segmentation unit 700 and paging unit 702 to produce a physical address. As indicated in FIG. 7, segmentation unit 700 receives a segmented address from execution unit 600 and uses a well-know segmented-to-linear address translation mechanism of the x86 processor architecture to produce a corresponding linear address at an output. As indicated in FIG. 7, when enabled by a "PAGING" signal, paging unit 702 receives the linear addresses produced by segmentation unit 700 and produces corresponding physical addresses at an output. The PAGING signal may mirror the paging flag (PG) bit in a control register 0 (CR0) of the x86 processor architecture and of the set of control registers 608 (FIG. 6). When the PAGING signal is deasserted, memory paging is not enabled, and selection logic 704 produces the linear address received from segmentation unit 700 as the physical address.

When the PAGING signal is asserted, memory paging is enabled, and paging unit 702 translates the linear address received from segmentation unit 700 to a corresponding physical address using the above described linear-to-physical address translation mechanism 100 of the x86 processor architecture (FIG. 1). As described above, during the linear-to-physical address translation operation, the contents of the U/S bits of the selected page directory entry and the selected page table entry are logically ANDed determine if the access to a page frame is authorized. Similarly, the contents of the R/W bits of the selected page directory entry and the selected page table entry are logically ANDed to determine if the access to the page frame is authorized. If the logical combinations of the U/S and R/W bits indicate the access to the page frame is authorized, paging unit 702 produces the physical address resulting from the linear-to-physical address translation operation. Selection logic 704 receives the physical address produced by paging unit 702, produces the physical address received from paging unit 702 as the physical address, and provides the physical address to cache unit 604.

On the other hand, if the logical combinations of the U/S and R/W bits indicate the access to the page frame 108 is not authorized, paging unit 702 does not produce a physical address during the linear-to-physical address translation operation. Instead, paging unit 702 asserts a general protection fault (GPF) signal, and MMU 602 forwards the GPF signal to execution unit 600. In response to the GPF signal, execution unit 600 may execute an exception handler routine, and may ultimately halt the execution of one of the application programs 500 (FIG. 5) running when the GPF signal was asserted.

In the embodiment of FIG. 7, CPU SCU 416 is located within paging unit 702 of MMU 602. Paging unit 702 may also include a translation lookaside buffer (TLB) for storing a relatively small number of recently determined linear-to-physical address translations.

Figure 8:
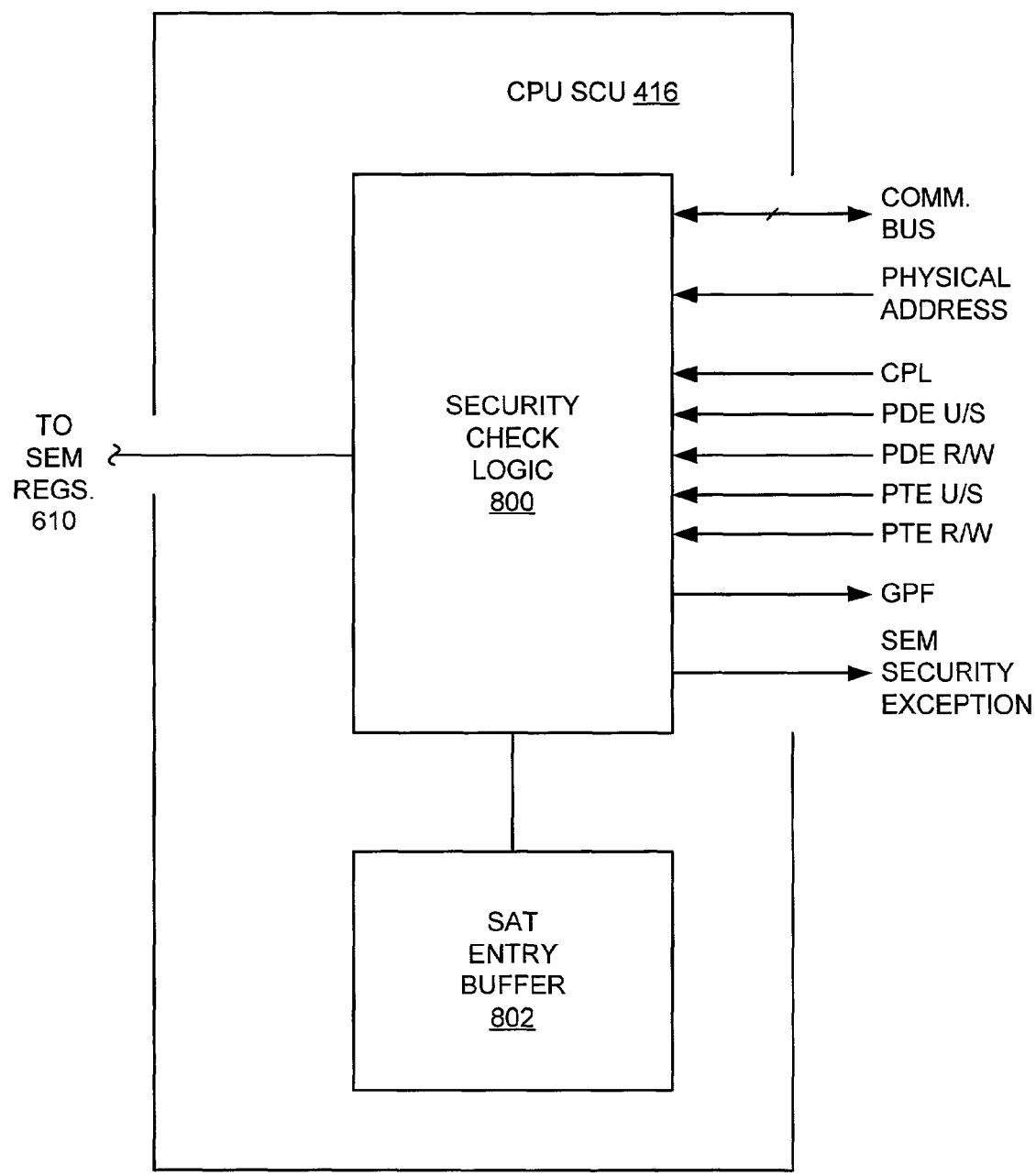
FIG. 8 is a diagram of one embodiment of the CPU SCU of FIG. 7.

FIG. 8 is a diagram of one embodiment of CPU SCU 416 of FIG. 7. In the embodiment of FIG. 8, CPU SCU 416 includes security check logic 800 coupled to the set of SEM registers 610 (FIG. 6) and a security attribute table (SAT) entry buffer 802. As described below, SAT entries include additional security information above the U/S and R/W bits of page directory and page table entries corresponding to memory pages. Security check logic 800 uses the additional security information stored within a given SAT entry to prevent unauthorized software-initiated accesses to the corresponding memory page. SAT entry buffer 802 is used to store a relatively small number of SAT entries of recently accessed memory pages.

As described above, the set of SEM registers 610 are used to implement a secure execution mode (SEM) within computer system 400 of FIG. 4. The contents of the set of SEM registers 610 govern the operation of CPU SCU 416. Security check logic 800 receives information to be stored in SAT entry buffer 802 from MMU 602 via a communication bus indicated in FIG. 8. The security check logic 800 also receives a physical address produced by paging unit 702.

Figure 9:
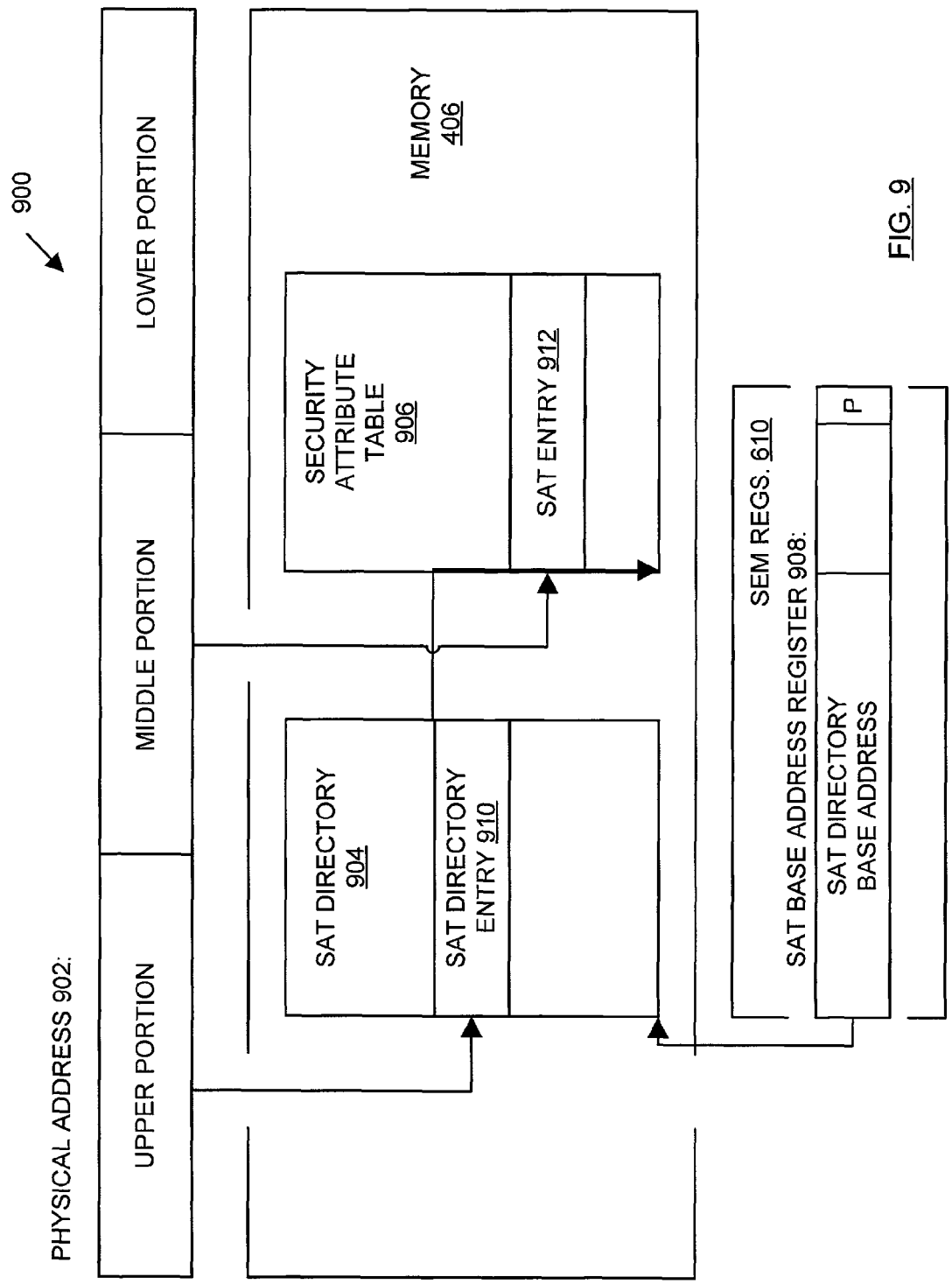
FIG. 9 is a diagram of one embodiment of a mechanism for accessing a security attribute table (SAT) entry of a selected memory page in order to obtain additional security information of the selected memory page.
Figure 10:
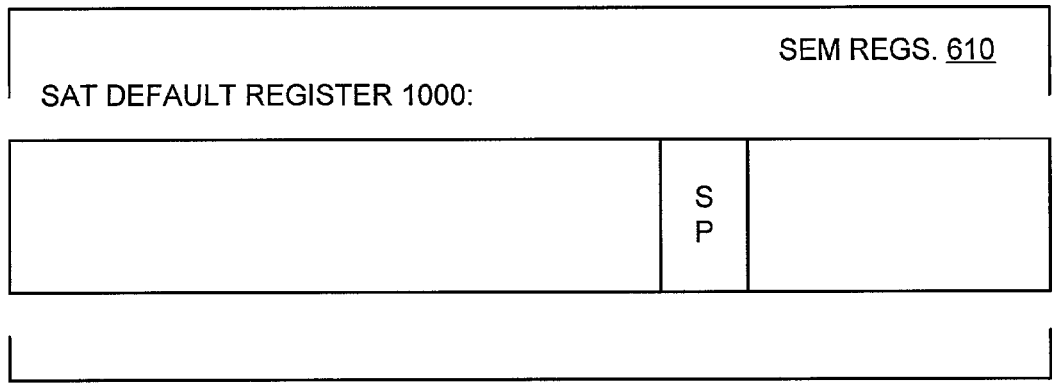
FIG. 10 is a diagram of one embodiment of a SAT default register.
Figure 11:
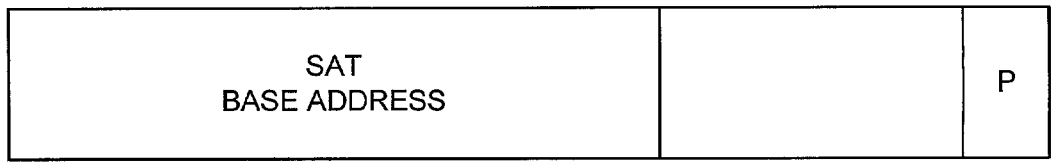
FIG. 11 is a diagram of one embodiment of a SAT directory entry format.

FIGS. 9-11 will now be used to describe how additional security information of memory pages selected using address translation mechanism 100 of FIG. 1 is obtained within computer system 400 of FIG. 4. FIG. 9 is a diagram of one embodiment of a mechanism 900 for accessing a SAT entry of a selected memory page in order to obtain additional security information of the selected memory page. Mechanism 900 of FIG. 9 may be embodied within security check logic 800 of FIG. 8, and may be implemented when computer system 400 of FIG. 4 is operating in the SEM. Mechanism 900 involves a physical address 902 produced by paging mechanism 702 (FIG. 7) using address translation mechanism 100 of FIG. 1, a SAT directory 904, multiple SATs including a SAT 906, and a SAT base address register 908 of the set of SEM registers 610. SAT directory 104 and the multiple SATs, including SAT 906, are SEM data structures created and maintained by security kernel 504 (FIG. 5). As described below, SAT directory 104 (when present) and any needed SAT is copied into memory 406 before being accessed.

SAT base address register 908 includes a present (P) bit which indicates the presence of a valid SAT directory base address within SAT base address register 908. The highest ordered (i.e., most significant) bits of SAT base address register 908 are reserved for the SAT directory base address. The SAT directory base address is a base address of a memory page containing SAT directory 904. If P=1, the SAT directory base address is valid, and SAT tables specify the security attributes of memory pages. If P=0, the SAT directory base address is not valid, no SAT tables exist, and security attributes of memory pages are determined by a SAT default register.

FIG. 10 is a diagram of one embodiment of the SAT default register 1000. In the embodiment of FIG. 10, SAT default register 1000 includes a secure page (SP) bit. The SP bit indicates whether or not all memory pages are secure pages. For example, if SP=0 all memory pages may not be secure pages, and if SP=1 all memory pages may be secure pages.

Referring back to FIG. 9 and assuming the P bit of SAT base address register 908 is a '1', physical address 902 produced by paging logic 702 (FIG. 7) is divided into three portions in order to access the SAT entry of the selected memory page. As described above, the SAT directory base address of SAT base address register 908 is the base address of the memory page containing SAT directory 904. SAT directory 904 includes multiple SAT directory entries, including a SAT directory entry 910. Each SAT directory entry may have a corresponding SAT in memory 406. An "upper" portion of physical address 902, including the highest ordered or most significant bits of physical address 902, is used as an index into SAT directory 904. SAT directory entry 910 is selected from within SAT directory 904 using the SAT directory base address of SAT base address register 908 and the upper portion of physical address 902.

FIG. 11 is a diagram of one embodiment of a SAT directory entry format 1100. In accordance with FIG. 11, each SAT directory entry includes a present (P) bit which indicates the presence of a valid SAT base address within the SAT directory entry. In the embodiment of FIG. 11, the highest ordered (i.e., the most significant) bits of each SAT directory entry are reserved for a SAT base address. The SAT base address is a base address of a memory page containing a corresponding SAT. If P=1, the SAT base address is valid, and the corresponding SAT is stored in memory 406.

If P=0, the SAT base address is not valid, and the corresponding SAT does not exist in memory 406 and must be copied into memory 406 from a storage device (e.g., a disk drive). If P=0, security check logic 800 may signal a page fault to logic within paging unit 702, and MMU 602 may forward the page fault signal to execution unit 600 (FIG. 6). In response to the page fault signal, execution unit 600 may execute a page fault handler routine which retrieves the needed SAT from the storage device and stores the needed SAT in memory 406. After the needed SAT is stored in memory 406, the P bit of the corresponding SAT directory entry is set to '1', and mechanism 900 is continued.

Figure 12:
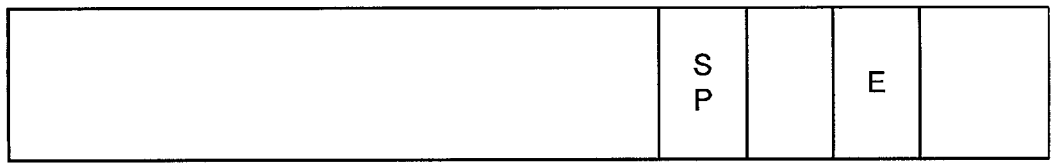
FIG. 12 is a diagram of one embodiment of a SAT entry format.

Referring back to FIG. 9, a "middle" portion of physical address 902 is used as an index into SAT 906. SAT entry 906 is thus selected within SAT 906 using the SAT base address of SAT directory entry 910 and the middle portion of physical address 902. FIG. 12 is a diagram of one embodiment of a SAT entry format 1200. In the embodiment of FIG. 12, each SAT entry includes a secure page (SP) bit. The SP bit indicates whether or not the selected memory page is a secure page. For example, if SP=0 the selected memory page may not be a secure page, and if SP=1 the selected memory page may be a secure page.

BIU 606 (FIG. 6) retrieves needed SEM data structure entries from memory 406, and provides the SEM data structure entries to MMU 602. Referring back to FIG. 8, security check logic 800 receives SEM data structure entries from MMU 602 and paging unit 702 via the communication bus. As described above, SAT entry buffer 802 is used to store a relatively small number of SAT entries of recently accessed memory pages. Security check logic 800 stores a given SAT entry in SAT entry buffer 802, along with a "tag" portion of the corresponding physical address.

During a subsequent memory page access, security check logic 800 may compare a "tag" portion of a physical address produced by paging unit 702 to tag portions of physical addresses corresponding to SAT entries stored in SAT entry buffer 802. If the tag portion of the physical address matches a tag portion of a physical address corresponding to a SAT entry stored in SAT entry buffer 802, security check logic 800 may access the SAT entry in SAT entry buffer 802, eliminating the need to perform the process of FIG. 9 in order to obtain the SAT entry from memory 406. Security kernel 504 (FIG. 5) modifies the contents of SAT base address register 908 in CPU 402 (e.g., during context switches). In response to modifications of SAT base address register 908, security check logic 800 of CPU SCU 416 may flush SAT entry buffer 802.

When computer system 400 of FIG. 4 is operating in the SEM, security check logic 800 receives the current privilege level (CPL) of the currently executing task (i.e., the currently executing instruction), along with the page directory entry (PDE) U/S bit, the PDE R/W bit, the page table entry (PTE) U/S bit, and the PTE R/W bit of a selected memory page within which a physical address resides. Security check logic 800 uses the above information, along with the SP bit of the SAT entry corresponding to the selected memory page, to determine if memory 406 access is authorized.

CPU 402 of FIG. 6 may be an x86 processor, and may include a code segment (CS) register, one of the 16-bit segment registers of the x86 processor architecture. Each segment register selects a 64 k block of memory, called a segment. In the protected mode with paging enabled, the CS register is loaded with a segment selector that indicates an executable segment of memory 406. The highest ordered (i.e., most significant) bits of the segment selector are used to store information indicating a segment of memory including a next instruction to be executed by execution unit 600 of CPU 402 (FIG. 6). An instruction pointer (IP) register is used to store an offset into the segment indicated by the CS register. The CS:IP pair indicate a segmented address of the next instruction. The two lowest ordered (i.e., least significant) bits of the CS register are used to store a value indicating a current privilege level (CPL) of a task currently being executed by execution unit 600 (i.e., the CPL of the current task).

Table 1 below illustrates exemplary rules for CPU-initiated (i.e., software-initiated) memory accesses when computer system 400 of FIG. 4 is operating in the SEM. CPU SCU 416 (FIGS. 4-8) and security kernel 504 (FIG. 5) work together to implement the rules of Table 1 when computer system 400 of FIG. 4 is operating in the SEM in order to provide additional security for data stored in memory 406 above data security provided by operating system 502 (FIG. 5).

TABLE 1

Exemplary Rules For Software-Initiated Memory Accesses When Computer System 400 Of FIG. 4 Is Operating In The SEM.

| Currently Executing Instruction | | Selected Memory Page | | | Permitted | |
|---|---|---|---|---|---|---|
| SP | CPL | SP | U/S | R/W | Access | Remarks |
| 1 | 0 | X | X | 1 (R/W) | R/W | Full access granted. (Typical accessed page contents: security kernel and SEM data structures.) |
| 1 | 0 | X | X | 0 (R) | Read Only | Write attempt causes GPF; if selected memory page is a secure page (SP = 1), a SEM Security Exception is signaled instead of GPF. |
| 1 | 3 | 1 | 1 (U) | 1 | R/W | Standard protection mechanisms apply. (Typical accessed page contents: high security applets.) |
| 1 | 3 | 1 | 0 (S) | X | None | Access causes GPF. (Typical accessed page contents: security kernel and SEM data structures.) |
| 1 | 3 | 0 | 0 | 1 | None | Access causes GPF. (Typical accessed page contents: OS kernel and Ring 0 device drivers.) |
| 0 | 0 | 1 | X | X | None | Access causes SEM security exception. |
| 0 | 0 | 0 | 1 | 1 | R/W | Standard protection mechanisms apply. (Typical accessed page contents: high security applets.) |
| 0 | 3 | X | 0 | X | None | Access causes GPF; if selected memory page is a secure page (SP = 1), a SEM Security Exception is raised instead of GPF. |
| 0 | 3 | 0 | 1 | 1 | R/W | Standard protection mechanisms apply. (Typical accessed page contents: applications.) |

In Table 1 above, the SP bit of the currently executing instruction is the SP bit of the SAT entry corresponding to the memory page containing the currently executing instruction. The U/S bit of the selected memory page is the logical AND of the PDE U/S bit and the PTE U/S bit of the selected memory page. The R/W bit of the selected memory page is the logical AND of the PDE R/W bit and the PTE R/W bit of the selected memory page. The symbol "X" signifies a "don't care": the logical value may be either a '0' or a '1'.

Referring back to FIG. 8, security check logic 800 of CPU SCU 416 produces a general protection fault ("GPF") signal and a "SEM SECURITY EXCEPTION" signal, and provides the GPF and the SEM SECURITY EXCEPTION signals to logic within paging unit 702. When security check logic 800 asserts the GPF signal, MMU 602 forwards the GPF signal to execution unit 600 (FIG. 6). In response to the GPF signal, execution unit 600 may use the well-known interrupt descriptor table (IDT) vectoring mechanism of the x86 processor architecture to access and execute a GPF handler routine.

When security check logic 800 asserts the SEM SECURITY EXCEPTION signal, MMU 602 forwards the SEM SECURITY EXCEPTION signal to execution unit 600. Unlike normal processor exceptions which use the use the IDT vectoring mechanism of the x86 processor architecture, a different vectoring method may be used to handle SEM security exceptions. SEM security exceptions may be dispatched through a pair of registers (e.g., model specific registers or MSRs) similar to the way x86 "SYSENTER" and "SYSEXIT" instructions operate. The pair of registers may be "security exception entry point" registers, and may define a branch target address for instruction execution when a SEM security exception occurs. The security exception entry point registers may define the code segment (CS), then instruction pointer (IP, or the 64-bit version RIP), stack segment (SS), and the stack pointer (SP, or the 64-bit version RSP) values to be used on entry to a SEM security exception handler. Under software control, execution unit 600 (FIG. 6) may push the previous SS, SP/RSP, EFLAGS, CS, and IP/RIP values onto a new stack to indicate where the exception occurred. In addition, execution unit 600 may push an error code onto the stack. It is noted that a normal return from interrupt (IRET) instruction may not be used as the previous SS and SP/RSP values are always saved, and a stack switch is always accomplished, even if a change in CPL does not occur. Accordingly, a new instruction may be defined to accomplish a return from the SEM security exception handler.

Figure 13:
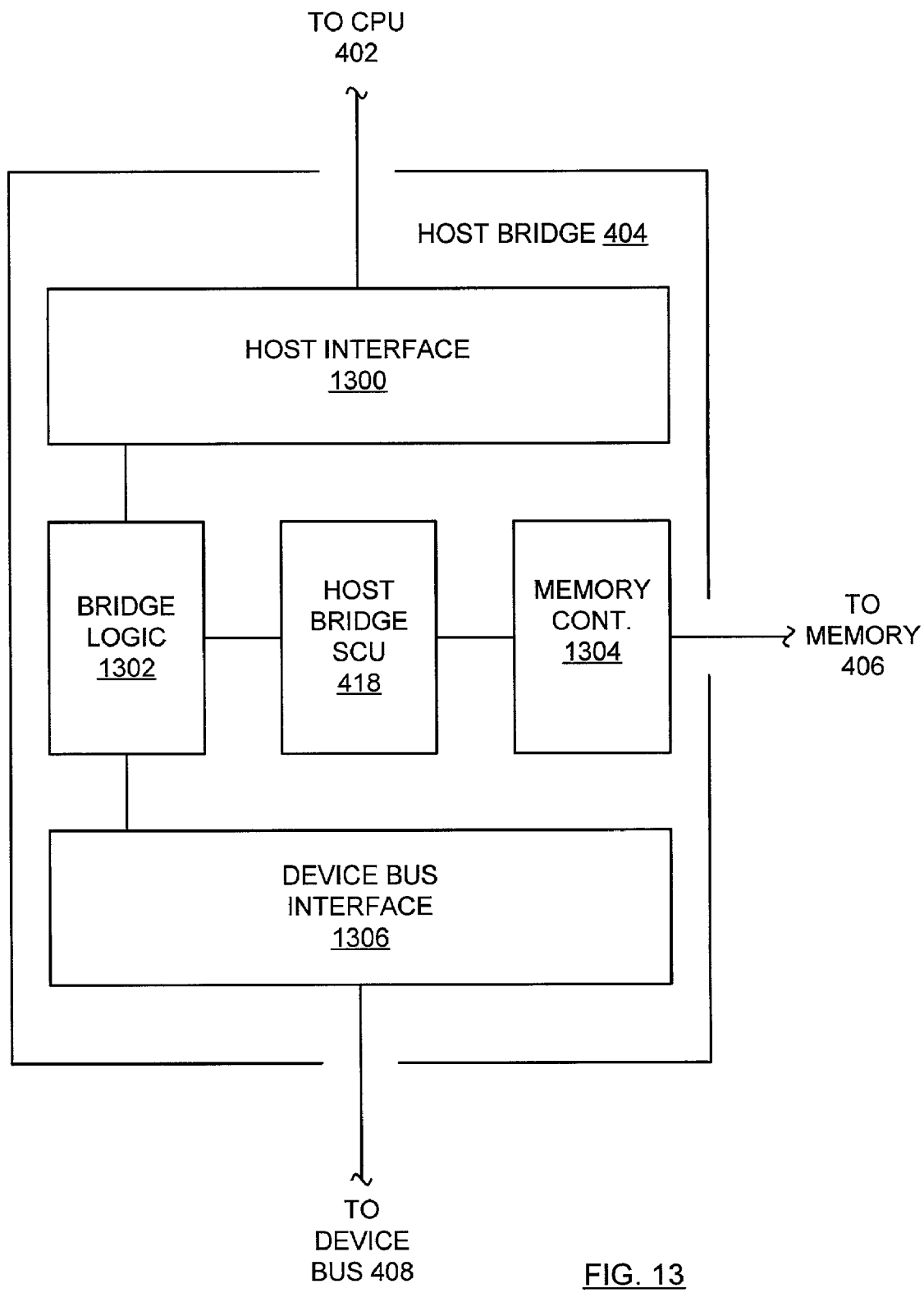
FIG. 13 is a diagram of one embodiment of the host bridge of FIG. 4, wherein the host bridge includes the host bridge SCU.

FIG. 13 is a diagram of one embodiment of host bridge 404 of FIG. 4. In the embodiment of FIG. 13, host bridge 404 includes a host interface 1300, bridge logic 1302, host bridge SCU 418, a memory controller 1304, and a device bus interface 1306. Host interface 1300 is coupled to CPU 402, and device bus interface 1306 is coupled to device bus 408. Bridge logic 1302 is coupled between host interface 1300 and device bus interface 1306. Memory controller 1304 is coupled to memory 406, and performs all accesses to memory 406. Host bridge SCU 418 is coupled between bridge logic 1302 and memory controller 1304. As described above, host bridge SCU 418 controls access to memory 406 via device bus interface 1306. Host bridge SCU 418 monitors all accesses to memory 406 via device bus interface 1306, and allows only authorized accesses to memory 406.

Figure 14:
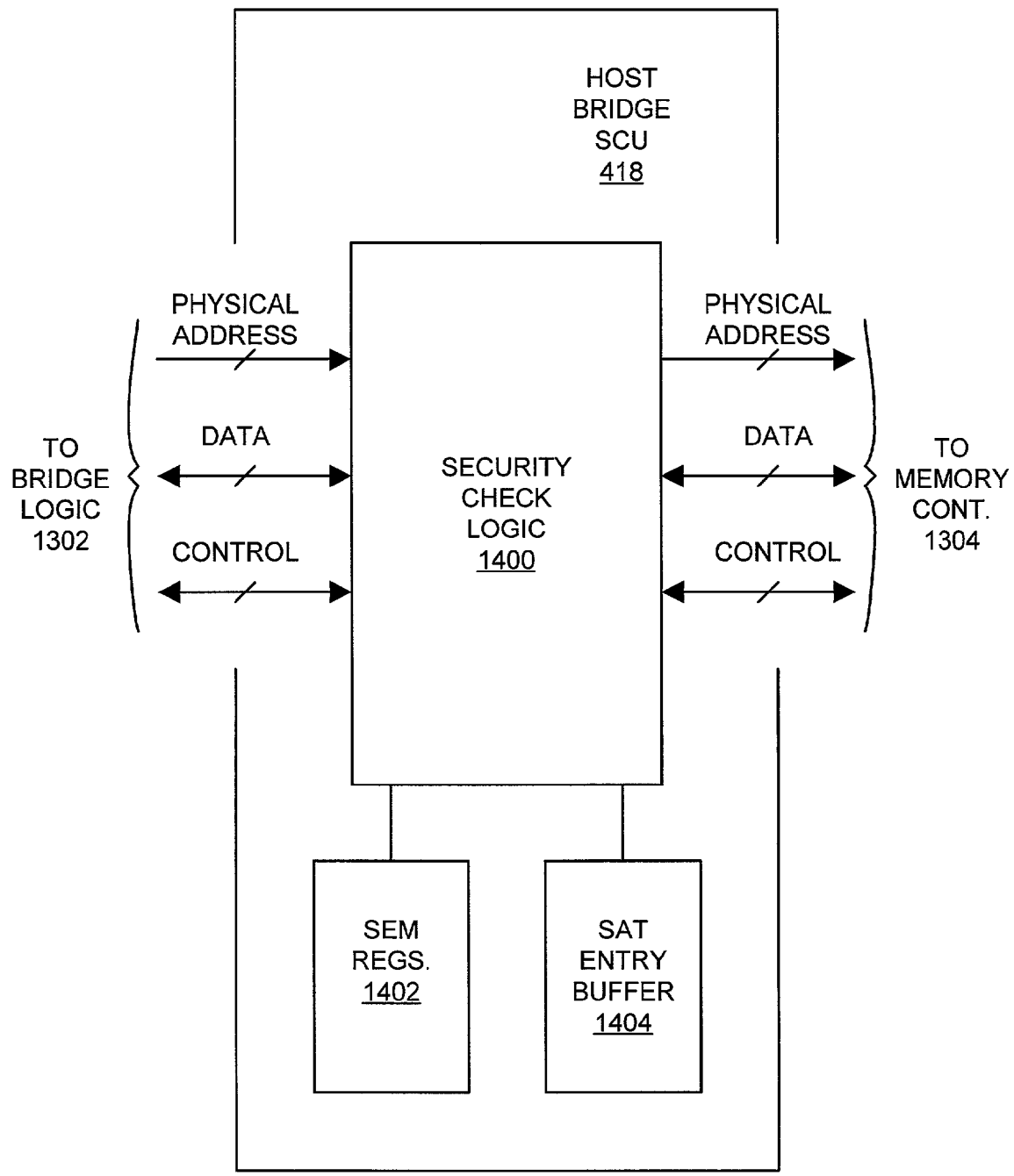
FIG. 14 is a diagram of one embodiment of the host bridge SCU of FIG. 13.

FIG. 14 is a diagram of one embodiment of host bridge SCU 418 of FIG. 13. In the embodiment of FIG. 14, host bridge SCU 418 includes security check logic 1400 coupled to a set of SEM registers 1402 and a SAT entry buffer 1404. The set of SEM registers 1402 govern the operation of security check logic 1400, and includes a second SAT base address register 908 of FIG. 9. The second SAT base address register 908 of the set of SEM registers 1402 may be an addressable register. When security kernel 504 (FIG. 5) modifies the contents of SAT base address register 908 in the set of SEM registers 610 of CPU 402 (e.g., during a context switch), security kernel 504 may also write the same value to the second SAT base address register 908 in the set of SEM registers 1402 of host bridge SCU 418. In response to modifications of the second SAT base address register 908, security check logic 1400 of host bridge SCU 418 may flush SAT entry buffer 1404.

Security check logic 1400 receives memory access signals of memory accesses initiated by hardware device units 414A-414D (FIG. 4) via device bus interface 1306 and bridge logic 1302 (FIG. 13). The memory access signals convey physical addresses from hardware device units 414A-414D, and associated control and/or data signals. Security check logic 1400 may embody mechanism 900 (FIG. 9) for obtaining SAT entries of corresponding memory pages, and may implement mechanism 900 when computer system 400 of FIG. 4 is operating in the SEM. SAT entry buffer 1404 is similar to SAT entry buffer 802 of CPU SCU 416 (FIG. 8) described above, and is used to store a relatively small number of SAT entries of recently accessed memory pages.

When computer system 400 of FIG. 4 is operating in SEM, security check logic 1400 of FIG. 14 uses additional security information of a SAT entry associated with a selected memory page to determine if a given hardware-initiated memory access is authorized. If the given hardware-initiated memory access is authorized, security check logic 1400 provides the memory access signals (i.e., address signals conveying a physical address and the associated control and/or data signals) of the memory access to memory controller 1304. Memory controller 1304 uses the physical address and the associated control and/or data signals to access memory 406. If memory 406 access is a write access, data conveyed by the data signals is written to memory 406. If memory 406 access is a read access, memory controller 1304 reads data from memory 406, and provides the resulting read data to security check logic 1400. Security check logic 1400 forwards the read data to bridge logic 1302, and bridge logic 1302 provides the data to device bus interface 1306.

If, on the other hand, the given hardware-initiated memory access is not authorized, security check logic 1400 does not provide the physical address and the associated control and/or data signals of memory 406 accesses to memory controller 1304. If the unauthorized hardware-initiated memory access is a memory write access, security check logic 1400 may signal completion of the write access and discard the write data, leaving memory 406 unchanged. Security check logic 1400 may also create a log entry in a log (e.g., set or clear one or more bits of a status register) in order to document the security access violation. Security kernel 504 may periodically access the log to check for such log entries. If the unauthorized hardware-initiated memory access is a memory read access, security check logic 1400 may return a false result (e.g., all "F"s) to device bus interface 1306 via bridge logic 1302 as the read data. Security check logic 1400 may also create a log entry as described above in order to document the security access violation.

Figure 15:
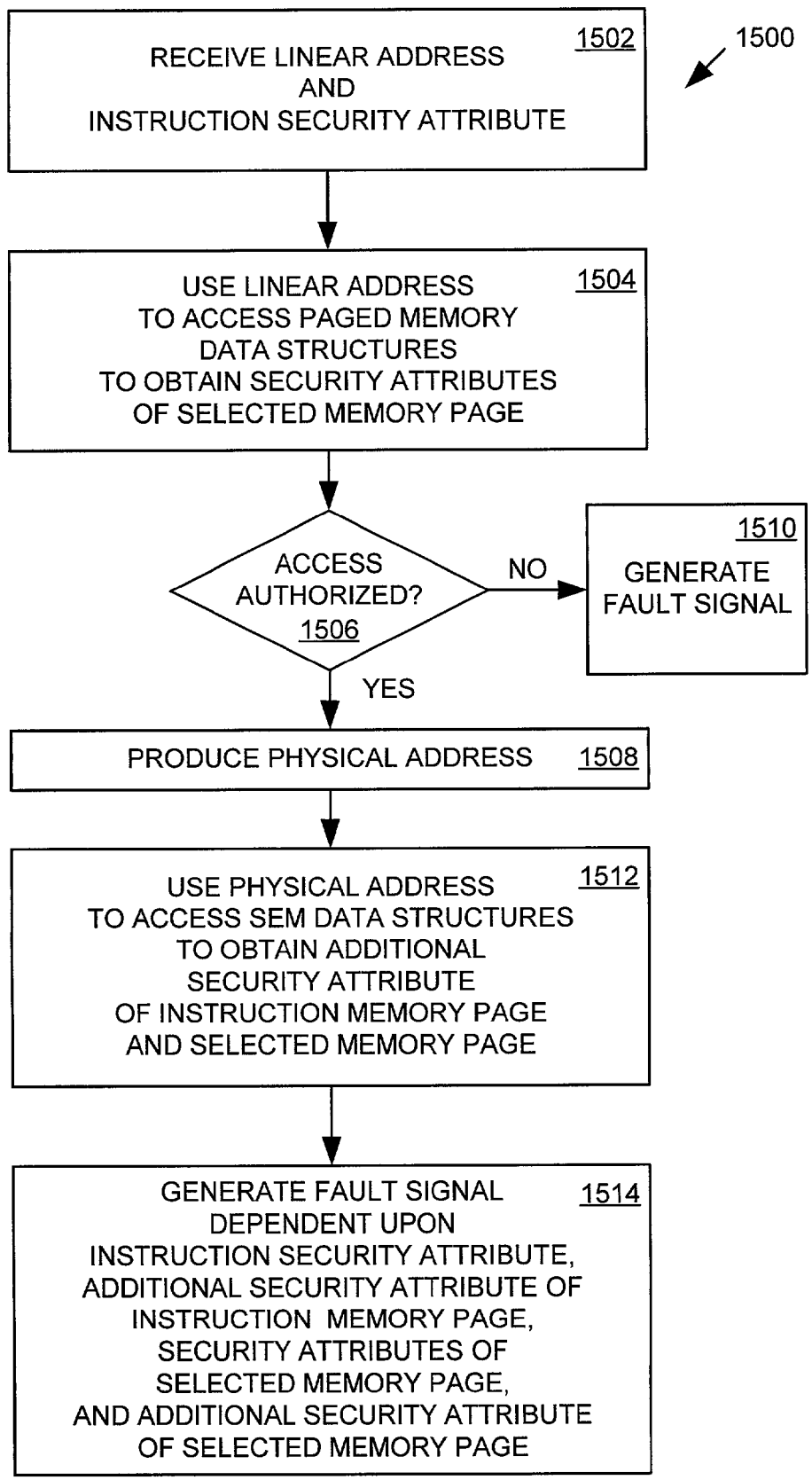
FIG. 15 is a flow chart of one embodiment of a first method for managing a memory used to store data arranged within multiple memory pages.

FIG. 15 is a flow chart of one embodiment of a method 1500 for providing access security for a memory used to store data arranged within multiple memory pages. Method 1500 reflects the exemplary rules of Table 1 for CPU-initiated (i.e., software-initiated) memory accesses when computer system 400 of FIG. 4 is operating in the SEM. Method 1500 may be embodied within MMU 602 (FIGS. 6-7). During a step 1502 of method 1500, a linear address produced during execution of an instruction is received, along with a security attribute of the instruction (e.g., a CPL of a task including the instruction). The instruction resides in a memory page. During a step 1504, the linear address is used to access at least one paged memory data structure located in the memory (e.g., a page directory and a page table) in order to obtain a base address of a selected memory page and security attributes of the selected memory page. The security attributes of the selected memory page may include, for example, a U/S bit and a R/W bit of a page directory entry and a U/S bit and a R/W bit of a page table entry.

During a decision step 1506, the security attribute of the instruction and the security attributes of the selected memory page are used to determine whether or not the access is authorized. If the access is authorized, the base address of the selected memory page and an offset are combined during a step 1508 to produce a physical address within the selected memory page. If the access is not authorized, a fault signal (e.g., a general protection fault signal or GPF signal) is generated during a step 1510.

During a step 1512 following step 1508, at least one security attribute data structure located in the memory (e.g., SAT directory 904 of FIG. 9 and a SAT) is accessed using the physical address of the selected memory page in order to obtain an additional security attribute of the first memory page and an additional security attribute of the selected memory page. The additional security attribute of the first memory page may include, for example, a secure page (SP)

bit as described above, wherein the SP bit indicates whether or not the first memory page is a secure page. Similarly, the additional security attribute of the selected memory page may include a secure page (SP) bit, wherein the SP bit indicates whether or not the selected memory page is a secure page.

The fault signal is generated during a step 1514 dependent upon the security attribute of the instruction, the additional security attribute of the first memory page, the security attributes of the selected memory page, and the additional security attribute of the selected memory page. It is noted that steps 1512 and 1514 of method 1500 may be embodied within CPU SCU 416 (FIGS. 4-8).

Table 2 below illustrates exemplary rules for memory page accesses initiated by device hardware units 414A-414D (i.e., hardware-initiated memory accesses) when computer system 400 of FIG. 4 is operating in the SEM. Such hardware-initiated memory accesses may be initiated by bus mastering circuitry within device hardware units 414A-414D, or by DMA devices at the request of device hardware units 414A-414D. Security check logic 1400 may implement the rules of Table 2 when computer system 400 of FIG. 4 is operating in the SEM in order to provide additional security for data stored in memory 406 above data security provided by operating system 502 (FIG. 5). In Table 2 below, the "target" memory page is the memory page within which a physical address conveyed by memory access signals of a memory access resides.

TABLE 2

Exemplary Rules For Hardware-Initiated Memory Accesses When Computer system 400 Of FIG. 4 Is Operating In The SEM.

| Particular Memory Page SP | Access Type | Action |
| --- | --- | --- |
| 0 | R/W | The access completes as normal. |
| 1 | Read | The access is completed returning all "F"s instead of actual memory contents. The unauthorized access may be logged. |
| 1 | Write | The access is completed but write data is discarded. Memory contents remain unchanged. The unauthorized access may be logged. |

In Table 2 above, the SP bit of the target memory page is obtained by host bridge SCU 418 using the physical address of the memory access and the above described mechanism 900 of FIG. 9 for obtaining SAT entries of corresponding memory pages.

Figure 2:
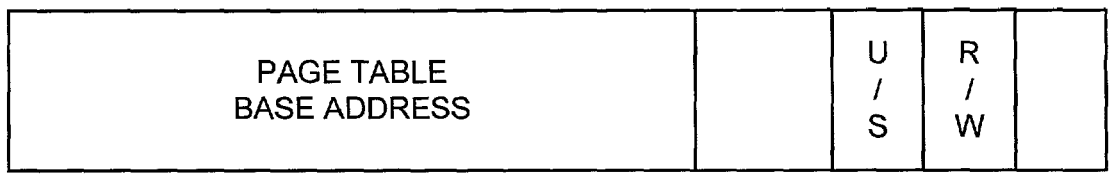
FIG. 2 is a diagram of a page directory entry format of the x86 processor architecture.
Figure 3:
FIG. 3 is a diagram of a page table entry format of the x86 processor architecture.

As indicated in FIG. 2, when SP=1 indicating the target memory page is a secure page, the memory access is unauthorized. In this situation, security check logic 1400 (FIG. 14) does not provide the memory access signals to the memory controller. A portion of the memory access signals (e.g., the control signals) indicate a memory access type, and wherein the memory access type is either a read access or a write access. When SP=1 and the memory access signals indicate the memory access type is a read access, the memory access is an unauthorized read access, and security check logic 1400 responds to the unauthorized read access by providing all "F"s instead of actual memory contents (i.e., bogus read data). Security check logic 1400 may also respond to the unauthorized read access by logging the unauthorized read access as described above.

When SP=1 and the memory access signals indicate the memory access type is a write access, the memory access is an unauthorized write access. In this situation, security check logic 1400 responds to the unauthorized write access by discarding write data conveyed by the memory access signals. Security check logic 1400 may also respond to the unauthorized write access by logging the unauthorized write access as described above.

Figure 16:
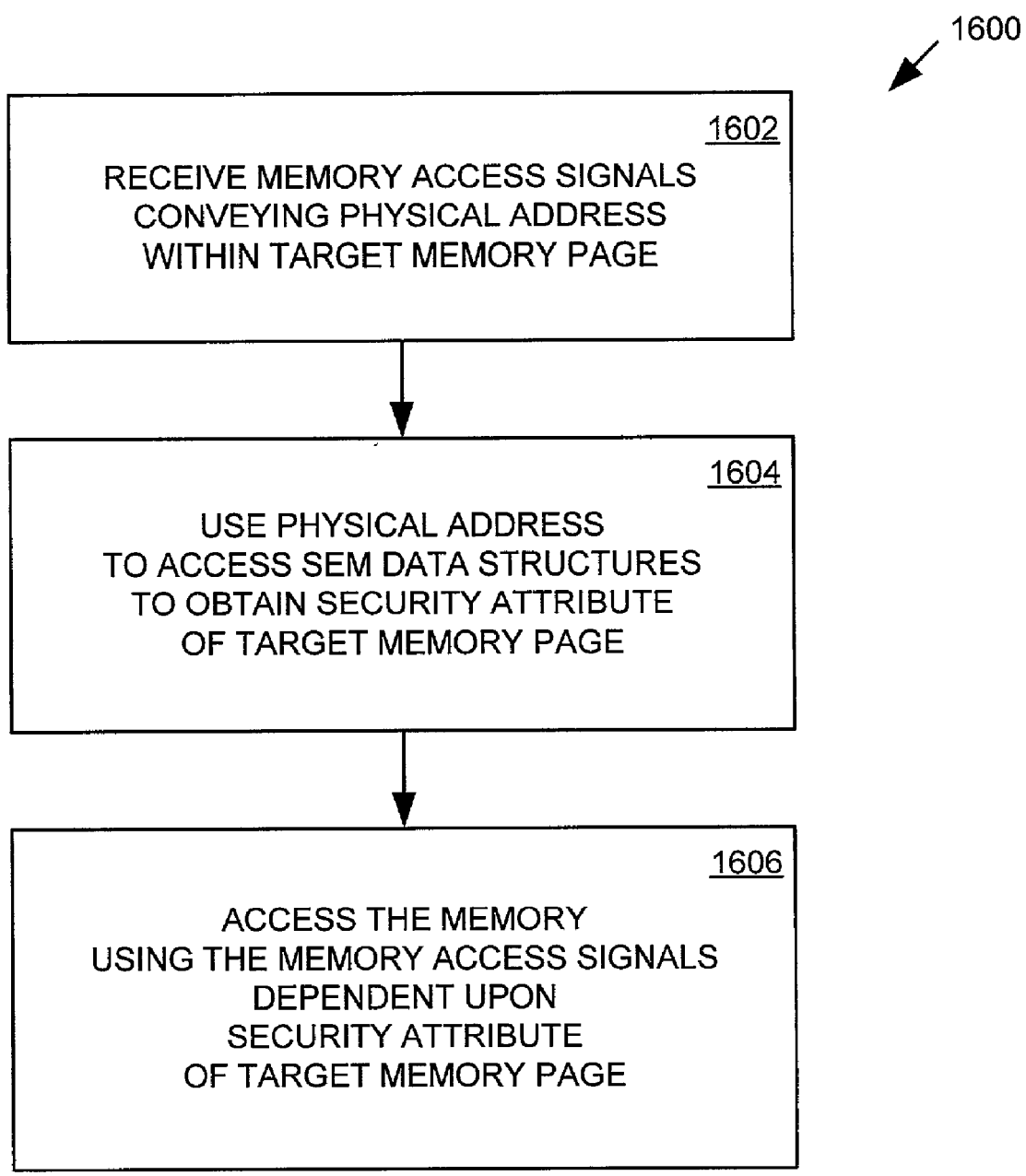
FIG. 16 is a flow chart of one embodiment of a second method for providing access security for a memory used to store data arranged within multiple memory pages.

FIG. 16 is a flow chart of one embodiment of a method 1600 for providing access security for a memory used to store data arranged within multiple memory pages. Method 1600 reflects the exemplary rules of Table 2 for hardware-initiated memory accesses when computer system 400 of FIG. 4 is operating in the SEM. Method 1600 may be embodied within host bridge 404 (FIGS. 4 and 13-14). During a step 1602 of method 1600, memory access signals of a memory access are received, wherein the memory access signals convey a physical address within a target memory page. As described above, the memory access signals may be produced by a device hardware unit. The physical address is used to access at least one security attribute data structure located in the memory in order to obtain a security attribute of the target memory page during a step 1604. The at least one security attribute data structure may include, for example, a SAT directory (e.g., SAT directory 904 in FIG. 9) and at least one SAT (e.g., SAT 906 in FIG. 9), and the additional security attribute of the target memory page may include a secure page (SP) bit as described above which indicates whether or not the target memory page is a secure page. During a step 1606, the memory is accessed using the memory access signals dependent upon the security attribute of the target memory page.

CPU 402 (FIGS. 4 and 6) communicates with other components of computer system 400 (FIG. 4) via signals conveyed upon signal lines. As described above, such signals are subject to monitoring (e.g., by external equipment). Analysis of such signals may reveal not only confidential data being transferred, but also methods embodied within the computer system (e.g., software programs) used to process the confidential data. Computer system 400 has the capability to encrypt all data (including instructions) transferred in and out of CPU 402 to mask both confidential data and methods used to process the confidential data.

As described above, cache unit 604 (FIG. 6) includes encryption/decryption unit 612 that is used to perform both a data encryption function and a data decryption function. When CPU 402 is operating in protected mode with paging enabled, memory 406 stores data arranged within multiple pages (i.e., memory pages) as described above. The data (including instructions) of selected memory pages may be encrypted for security purposes. The data decryption function of encryption/decryption unit 612 is used to decrypt encrypted data (including instructions) received by cache unit 604 from memory 406 via BIU 606. The data encryption function of encryption/decryption unit 612 is used to encrypt unencrypted (i.e., "plaintext") data (including instructions), stored within cache unit 604 and available to execution unit 600, before the data is evicted from cache unit 604 (e.g., to make room for more recently referenced instructions and/or data). Encryption/decryption unit 612 may employ any of various encryption and decryption algorithms to encrypt and decrypt data.

Referring back to FIG. 12, SAT entry format 1200 entry includes an encrypt memory (E) bit in addition to the SP bit described above. The E bit indicates whether or not data stored in memory locations of the corresponding memory page is encrypted. For example, if E=0, data in the corresponding memory page may not be encrypted, and if E=1, data in the corresponding memory page may be encrypted.

Figure 17:
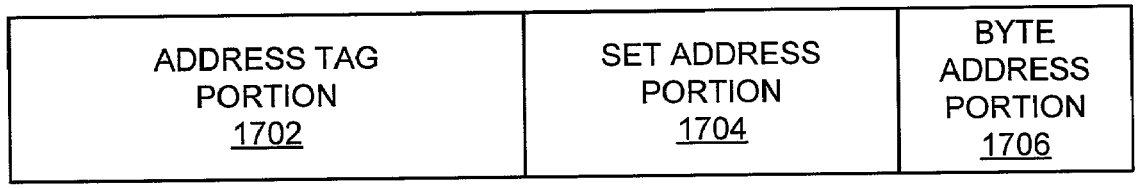
FIG. 17 is a diagram of an exemplary physical address generated by the MMU of FIG. 6 and provided to the cache unit of FIG. 6.
Figure 18:
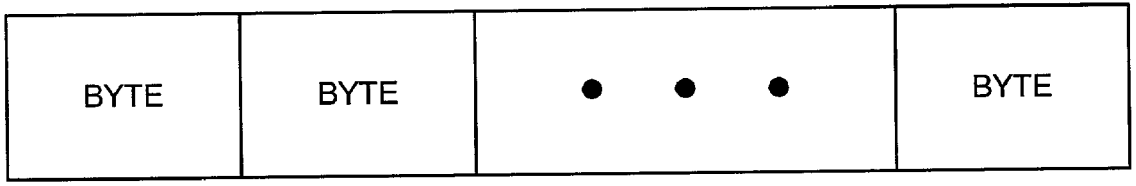
FIG. 18 is a diagram of one embodiment of a cache memory entry of the cache unit of FIG. 6.
Figure 19:
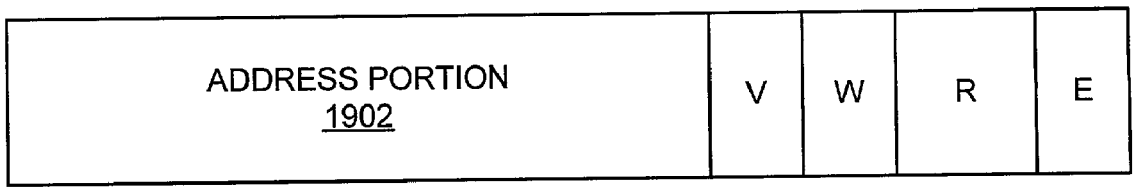
FIG. 19 is a diagram of one embodiment of a cache directory entry of the cache unit of FIG. 6.

FIGS. 17-19 will now be used to describe the operation of an embodiment of cache unit 604 of FIG. 6 where cache unit 604 is a set associative cache unit having multiple sets. As a set associative cache unit, cache unit 604 may be considered as being arranged as two-dimensional arrays having rows and columns. Each row represents one of multiple "sets" of cache unit 604, and each column represents one of multiple "ways" of cache unit 604. Data mapped to a particular row (i.e., set) of cache unit 604 may be stored in any of the multiple columns (i.e., ways) of the set.

FIG. 17 is a diagram of an exemplary physical address 1700 generated by MMU 602 of FIG. 6 and provided to cache unit 604 of FIG. 6. Cache unit 604 divides physical address 1700 into three portions: an upper "address tag" portion 1702 including the highest ordered (i.e., most significant) bits of physical address 1700, a middle "set address" portion 1704, and a lower "byte address" portion 1706 including the lowest ordered (i.e., least significant) bits of physical address 1700. The bits of set address portion 1704 are used to select one of the multiple sets of cache unit 604, and the bits of byte address portion 1706 are used to select a particular byte within a corresponding cache memory entry present within cache unit 604.

FIG. 18 is a diagram of one embodiment of a cache memory entry 1800 of cache unit 604 of FIG. 6. Each cache memory entry is used to store multiple bytes of data (e.g., instructions). FIG. 19 is a diagram of one embodiment of a cache directory entry 1900 of cache unit 604 of FIG. 6. Each cache directory entry corresponds to a different cache memory entry, and is used to store data associated with the corresponding cache memory entry. In the embodiment of FIG. 19, cache directory entry 1900 includes an address portion 1902 and a control portion 1904. Address portion 1902 includes multiple bit positions, and is used to store an address tag portion of a physical address (e.g., address tag portion 1702 of physical address 1700) associated with data stored in the corresponding cache memory entry. Control portion 1904 also includes multiple bit positions, and is used to store data used to manage the contents of the corresponding cache memory entry.

In the embodiment of FIG. 19, control portion 1904 of the cache directory entry 1900 includes a valid (V) bit, a write protect (W) bit, one or more replacement (R) bits, and an encrypt data (E) bit. The valid (V) bit specifies whether or not the contents of the corresponding cache memory entry is valid or not. For example, if V=1, the corresponding cache memory entry may store valid data. On the other hand, if V=0, the contents of the corresponding cache memory entry may not be valid. The write protect (W) bit specifies whether or not the contents of the corresponding cache memory entry is write protected. For example, W=1 may indicate that the contents of the corresponding cache memory entry may not be written, while W=0 may indicate that the contents of the corresponding cache may be written.

The one or more replacement (R) bits are used to implement a strategy for replacing the contents of the corresponding cache memory entry. The replacement strategy may be, for example, a least recently used (LRU) replacement strategy. The encrypt data (E) bit specifies whether or not the contents of the corresponding cache memory entry is encrypted. For example, E=1 may indicate that the contents of the corresponding cache memory entry is encrypted, while E=0 may indicate that the contents of the corresponding cache is not encrypted.

When cache unit 604 (FIG. 6) receives a physical address (e.g., physical address 1700 of FIG. 17) from MMU 602 (FIG. 6) associated with data required by execution unit 600 (e.g., an instruction), cache unit 604 uses set address portion 1704 of physical address 1700 as an index into rows (i.e., sets) of the two-dimensional cache structure of cache unit 604. Used as an index, set address portion 1704 selects a particular set within cache unit 604. Cache unit 604 then compares address tag portion 1702 of physical address 1700 to address portions 1902 of (valid) cache directory entries 1900 of each column (i.e., way) within the selected row (i.e., set). If a match is found, a cache "hit" occurs, and cache unit 604 uses byte address portion 1706 of physical address 1700 to provide the requested data byte.

If the comparison does not produce a match, a cache "miss" occurs, signaling a need to obtain the requested data from memory 406 (FIG. 4). In this situation, cache unit 604 provides physical address 1700 to BIU 606 (FIG. 6) along with a "cache miss" signal. In response, BIU 606 uses physical address 1700 to obtain a block of data (i.e., a cache line) including the requested data from memory 406, and provides the block of data including the requested data to cache unit 604.

When a cache miss occurs, cache unit 604 also provides the cache miss signal to CPU SCU 416 (FIG. 6). Following the linear-to-physical address translation operation performed by MMU 602, CPU SCU 416 uses the physical address to obtain a SAT entry of a memory page including the physical address (i.e., a SAT entry of a corresponding memory page) as described above. In response to the cache miss signal from cache unit 604, CPU SCU 416 provides the value of the encrypt data (E) bit in the corresponding SAT entry to cache unit 604. (See FIG. 12.)

If the encrypt memory (E) bit in the corresponding SAT entry is set, the block of data obtained from memory 406 by BIU 606 is encrypted. In this situation, cache unit 604 uses encryption/decryption unit 612 (FIG. 6) to decrypt the block of data before storing the block of data in a cache memory entry of a way of the selected set. Cache unit 604 also sets the encrypt data (E) bit of the control portion 1904 of the corresponding cache directory entry 1900. (See FIG. 19.)

If all of the ways of the selected set contain valid data, cache unit 604 may implement the replacement strategy to evict a cache line from cache unit 604 in order to make room for the block of data obtained from memory 406 by BIU 606. If the encrypt data (E) bit of a cache directory entry 1900 corresponding to a cache memory entry 1800 (i.e., a cache line) evicted from cache unit 604 is set, cache unit 604 uses encryption/decryption unit 612 to encrypt the block of data before providing the evicted cache line to BIU 606 to be written to memory 406.

Figure 20:
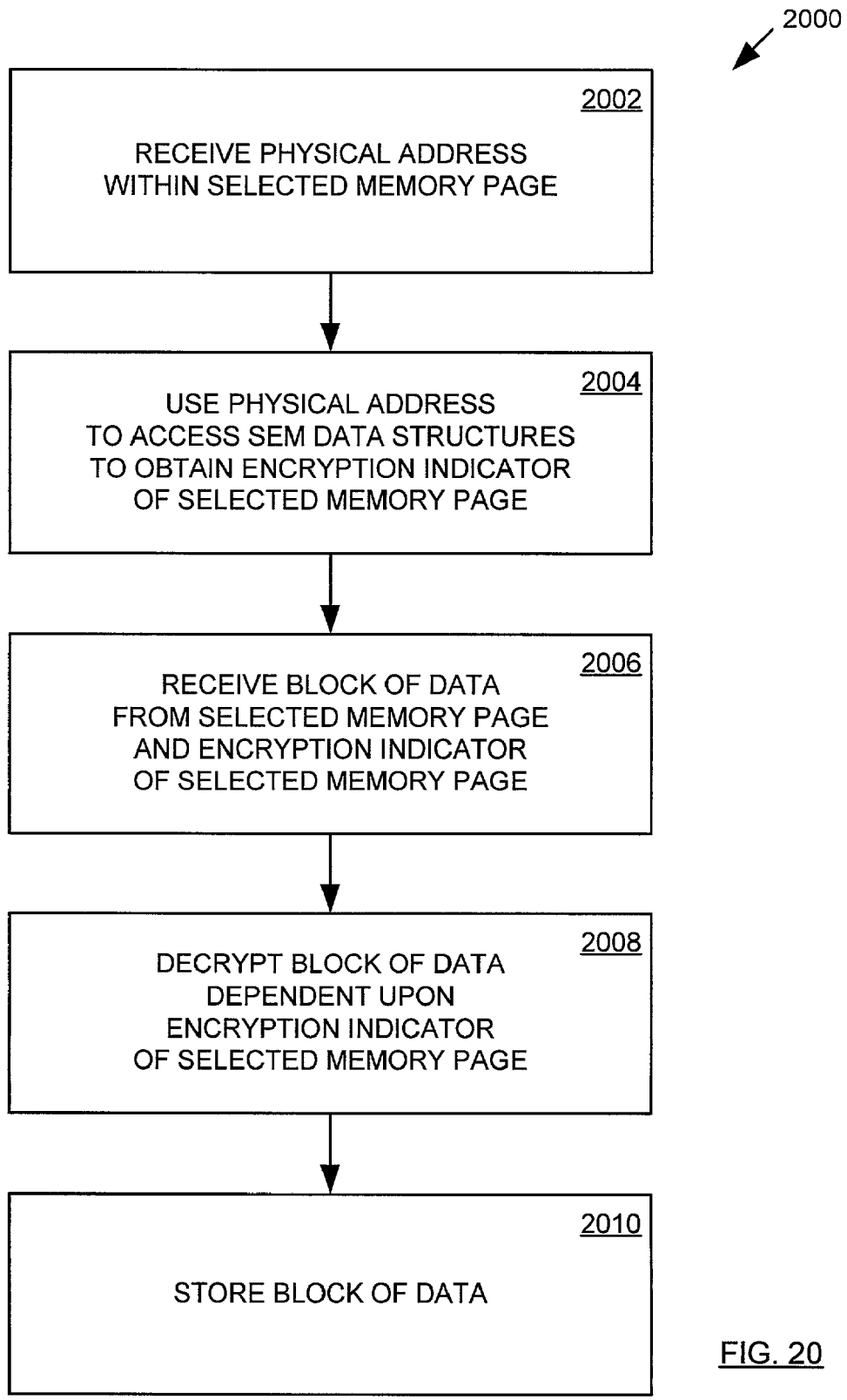
FIG. 20 is a flow chart of one embodiment of a method for providing security for data stored within the memory of FIG. 4 and transferred between the CPU of FIG. 4 and the memory.

FIG. 20 is a flow chart of one embodiment of a method 2000 for providing security for data stored within memory 406 (FIG. 4) and transferred between CPU 402 (FIG. 4) and memory 406. As described above, data stored within memory 406 is arranged within multiple memory pages. During a step 2002 of method 2000, a physical address within a selected memory page is received. The physical address is used during a step 2004 to access the SEM data structures located in memory 406 in order to obtain an encryption indicator of the selected memory page. As described above, the SEM data structures include SAT directory 904 (FIG. 9) and at least one SAT (e.g., SAT 906 of FIG. 9). The encryption indicator of the selected memory page indicates whether or not data stored in the selected memory page is encrypted. The encryption indicator of the selected memory page may be, for example, the encrypt memory (E) bit of the SAT entry corresponding to the selected memory page. (See FIG. 12.)

During a step 2006, a block of data from the selected memory page and the encryption indicator are received. The block of data may, for example, include multiple data units (e.g., bytes of data) stored within contiguous locations of memory 406. The block of data is decrypted during a step 2008 dependent upon the encryption indicator, and the block of data is stored during a step 2010.

It is noted that steps 2002 and 2004 of method 2000 may be embodied within CPU SCU 416 (FIGS. 4 and 6-8), and steps 2006, 2008, and 2010 of method 2000 may be embodied within cache unit 604 (FIG. 6).

It is also noted that the encrypting of select data (e.g., confidential data and software programs used to process the confidential data) within computer system 400 when present outside of CPU 402 (e.g., when stored within memory 406), and the transfer of encrypted data between CPU 402 and other components of computer system 400 (e.g., memory 406) masks both the confidential data and the software programs used to process the confidential data. Note also that while the methods of the present invention have been described using flowcharts, the methods of the present invention are not limited to the embodiments shown. In other embodiments, one or more steps of the method may be performed in different orders or omitted.

In the illustrated embodiments, the memory region used is the memory page. In other embodiments, other granularities of the memory may be used, including memory segments or memory address pairs, such as base-band pairs. Memory address pairs may include an upper and lower address defining the memory range, or a base memory with an extent, such as in base-band pairs. In one embodiment, the granularity of the memory region used is the granularity used by the operating system. In another embodiment, the granularity of the memory region used is the granularity used by the hardware.

Some aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computing apparatus, comprising:
at least one storage location coupled to receive a block of data from a memory and a corresponding encryption indicator for the block of data, wherein the block of data corresponds to a selected memory region of the memory, and wherein the encryption indicator indicates whether the data corresponding to the selected memory region is encrypted in the memory; and
an encryption/decryption unit configured to decrypt the block of data dependent upon the encryption indicator before the block of data is stored in the storage location.

2. The computing apparatus as recited in claim 1, wherein the block of data comprises a plurality of data units stored within contiguous locations of the memory.

3. The computing apparatus as recited in claim 2, wherein the selected memory region corresponds to a memory page, a memory segment, or a base-band pair.

4. The computing apparatus as recited in claim 1, wherein the encryption indicator is an encrypt memory bit.

5. The computing apparatus as recited in claim 4, wherein the encrypt memory bit is obtained by accessing a security attribute data structure stored within the memory.

6. The computing apparatus as recited in claim 1, wherein the storage location comprises a cache coupled to receive the block of data and the corresponding encryption indicator from the selected memory region in the memory.

7. The computing apparatus as recited in claim 6, wherein the cache includes a plurality of cache memory entries for storing blocks of data and a plurality of cache directory entries for storing data needed to access the blocks of data, and wherein each of the cache directory entries corresponds to a different one of the cache memory entries and includes an encrypt data bit indicating whether a block of data stored in the corresponding cache memory entry is to be encrypted before being stored in the memory.

8. The computing apparatus as recited in claim 7, wherein when a block of data stored in a given cache memory entry is to be stored in the memory, the cache unit is configured to use the encryption/decryption unit to encrypt the block of data dependent upon the encrypt data bit in the cache directory entry corresponding to the given cache memory entry before storing the block of data in the memory.

9. A system, comprising:
a memory management unit configured to manage a memory such that the memory stores data arranged within a plurality of memory regions;
a security check unit coupled to receive a physical address within a selected one of the memory regions and configured to use the physical address to access a security attribute data structure located in the memory in order to obtain an encryption indicator indicating whether data stored in the selected memory region is encrypted in the memory; and a cache unit coupled to receive a block of data obtained from the selected memory region and to receive the encryption indicator from the security check unit, the cache unit comprising:

an encryption/decryption unit configured to decrypt the received block of data dependent upon the encryption indicator before the received block of data is stored in the cache unit.

10. The system as recited in claim 9, wherein the received block of data comprises a plurality of data units stored within contiguous locations of the memory.

11. The memory as recited in claim 10, wherein the selected memory region corresponds to a memory page, a memory segment, or a base-band pair.

12. The system as recited in claim 9, wherein the security attribute data structure comprises a security attribute table directory and a security attribute table, the security attribute table comprising a security attribute table entry, and wherein the encryption indicator is an encrypt memory bit in the security attribute table entry.

13. The system as recited in claim 9, wherein the cache unit includes a plurality of cache memory entries for storing blocks of data and a plurality of cache directory entries for storing data needed to access the blocks of data, and wherein each of the cache directory entries corresponds to a different one of the cache memory entries, and wherein each of the cache directory entries includes an encrypt data bit indicating whether a block of data stored in the corresponding cache memory entry is to be encrypted before being stored in the memory.

14. The system as recited in claim 13, wherein when a block of data stored in a given cache memory entry is to be stored in the memory, and the cache unit is configured to use the encryption/decryption unit to encrypt the block of data dependent upon the encrypt data bit in the cache directory entry corresponding to the given cache memory entry before storing the encrypted block of data in the memory.

15. The system as recited in claim 9, wherein the security check unit is configured to use the physical address to access the at least one security attribute data structure located in the memory to obtain an additional security attribute of the selected memory region and the encryption indicator and to generate a fault signal dependent upon the security attributes of selected memory region and the additional security attribute of the selected memory region.

16. The system as recited in claim 15, wherein the security attributes of the selected memory region comprise a user/supervisor bit and a read/write bit as defined by the x86 processor architecture.

17. The system as recited in claim 15, wherein the additional security attribute comprises a secure page bit, and wherein the secure page bit indicates whether the selected memory region is a secure region.

18. The system as recited in claim 15, wherein the fault signal is a general protection fault signal as defined by the x86 processor architecture.

19. The system as recited in claim 9, wherein the security check unit is comprised within the memory management unit.

20. The system as recited in claim 9, wherein the memory management unit, the security check unit, and the cache unit are comprised within a processor.

21. A computer system, comprising:

a memory for storing data, wherein the data includes instructions;

a memory management unit operably coupled to the a memory and configurable to manage the memory such that the memory stores data arranged within a plurality of memory regions;

a security check unit coupled to receive a physical address within a selected one of the memory regions and configured to use the physical address to access at least one security attribute data structure located in the memory in order to obtain an encryption indicator indicating whether data stored in the selected memory region is encrypted in the memory; and a cache unit coupled to receive a block of data obtained from the selected memory region and to receive the encryption indicator from the security check unit, the cache unit comprising:

an encryption/decryption unit configured to decrypt the received block of data dependent upon the encryption indicator before the received block of data is stored in the cache unit.

22. The computer system as recited in claim 21, wherein the received block of data comprises a plurality of data units stored within contiguous locations of the memory.

23. The memory as recited in claim 22, wherein the selected memory region corresponds to a memory page, a memory segment, or a base-band pair.

24. The computer system as recited in claim 21, wherein the security attribute data structure comprises a security attribute table directory and a security attribute table, the security attribute table including a security attribute table entry, and wherein the encryption indicator is an encrypt memory bit in the security attribute table entry.

25. A method for providing security for data stored within a memory, wherein the data are arranged within a plurality of memory regions, the method comprising:

receiving an address within a selected one of the memory regions;

using the address to access an encryption indicator indicating whether data stored in the selected memory region is encrypted in the memory;

receiving a block of data from the selected memory region and the encryption indicator; and decrypting the received block of data dependent upon the encryption indicator.

26. The method as recited in claim 25, further comprising storing the received block of data.

27. The method as recited in claim 25, wherein receiving the block of data from the selected memory region and the encryption indicator comprises receiving a plurality of data units stored within contiguous locations from the selected memory region and the encryption indicator, and wherein decrypting the block of data dependent upon the encryption indicator further comprises decrypting the plurality of data units stored within contiguous locations dependent upon the encryption indicator.

28. The method as recited in claim 25, wherein receiving the address within the selected memory region comprises receiving a physical address within the selected memory region, and wherein using the address to access the encryption indicator comprises using the physical address to access the encryption indicator.

29. The method as recited in claim 28, wherein using the physical address to access an encryption indicator further comprises using the physical address to access at least one security attribute data structure located in the memory to obtain the encryption indicator.

30. The method as recited in claim 29, wherein comprises using the physical address to access at least one security attribute data structure located in the memory to obtain the encryption indicator further comprises using the physical address to access a security attribute table entry comprising an encrypted memory bit.

31. A non-transitory machine readable medium encoded with instructions that, when executed by a computer system, perform a method for providing security for data stored within a memory and arranged within a plurality of memory regions, the method comprising:
  receiving an address within a selected memory region;
  using the address to access an encryption indicator indicating whether data stored in the selected memory region is encrypted in the memory;
  receiving a block of data from the selected memory region and the encryption indicator; and
  decrypting the received block of data dependent upon the encryption indicator.

32. The non-transitory machine readable medium as recited in claim 31, the method further comprising storing the received block of data.

33. The non-transitory machine readable medium as recited in claim 31, wherein receiving the block of data from the selected memory region and the encryption indicator comprises receiving a plurality of data units stored within contiguous locations from the selected memory region and the encryption indicator, and wherein decrypting the block of data dependent upon the encryption indicator further comprises decrypting the plurality of data units stored within contiguous locations dependent upon the encryption indicator.

34. The non-transitory machine readable medium as recited in claim 31, wherein receiving the address within the selected memory region comprises receiving a physical address within the selected memory region, and wherein using the address to access the encryption indicator comprises using the physical address to access the encryption indicator.

35. The non-transitory machine readable medium as recited in claim 34, wherein using the physical address to access an encryption indicator further comprises using the physical address to access at least one security attribute data structure located in the memory to obtain the encryption indicator.

36. The non-transitory machine readable medium as recited in claim 35, wherein using the physical address to access at least one security attribute data structure located in the memory to obtain the encryption indicator further comprises using the physical address to access a security attribute table entry comprising an encrypted memory bit.

37. A system, comprising: means for receiving an address within a selected memory region in a memory; means for using the received address to access an encryption indicator indicating whether
  data stored in the selected memory region is encrypted in the memory;
  means for receiving a block of data from the selected memory region and the encryption indicator; and
  means for decrypting the received block of data dependent upon the encryption indicator; and
  means for storing the received block of data.

38. The system as recited in claim 37, wherein the means for receiving the block of data from the selected memory region and the encryption indicator comprises means for receiving a plurality of data units stored within contiguous locations from the selected memory region and the encryption indicator, and wherein the means for decrypting the block of data dependent upon the encryption indicator further comprises means for decrypting the plurality of data units stored within contiguous locations dependent upon the encryption indicator.

39. The system as recited in claim 37, wherein the means for receiving the address within the selected memory region comprises means for receiving a physical address within the selected memory region, and wherein the means for using the address to access the encryption indicator comprises means for using the physical address to access the encryption indicator.

40. The system as recited in claim 39, wherein the means for using the physical address to access an encryption indicator further comprises means for using the physical address to access at least one security attribute data structure located in the memory to obtain the encryption indicator.

41. The system as recited in claim 40, wherein the means for using the physical address to access at least one security attribute data structure located in the memory to obtain the encryption indicator further comprises means for using the physical address to access a security attribute table entry comprising an encrypted memory bit.

* * * * *